(12) United States Patent
Altendorfer et al.

(10) Patent No.: US 12,243,417 B2
(45) Date of Patent: Mar. 4, 2025

(54) CONTROL SYSTEM AND CONTROL METHOD FOR PATH ASSIGNMENT OF TRAFFIC OBJECTS

(71) Applicant: ZF Active Safety GmbH, Koblenz (DE)

(72) Inventors: Richard Altendorfer, Koblenz (DE); Benedikt Joebgen, Bad Bodendorf (DE); Andreas Stahl, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 701 days.

(21) Appl. No.: 16/824,939

(22) Filed: Mar. 20, 2020

(65) Prior Publication Data

US 2020/0302783 A1    Sep. 24, 2020

(30) Foreign Application Priority Data

Mar. 22, 2019 (DE) .................... 10 2019 107 411.8

(51) Int. Cl.
*G08G 1/01* (2006.01)
*B60W 30/10* (2006.01)
(Continued)

(52) U.S. Cl.
CPC .......... *G08G 1/0133* (2013.01); *B60W 30/10* (2013.01); *B60W 40/04* (2013.01); *B60W 50/00* (2013.01);
(Continued)

(58) Field of Classification Search
CPC ...... G08G 1/0133; G08G 1/012; G08G 1/166; G08G 1/167; B60W 30/10; B60W 40/04;
(Continued)

(56) References Cited

U.S. PATENT DOCUMENTS 6,201,482 B1 *   3/2001   Schiefele ............... G08G 5/006
    340/963
2006/0031015 A1 *   2/2006   Paradie .................... G06T 7/70
    340/436
(Continued)

FOREIGN PATENT DOCUMENTS

DE    102005002760         8/2005
DE    102005002760 A1 *   8/2005   ............... B60T 7/22
(Continued)

OTHER PUBLICATIONS

J. Kim and D. Kum, "Collision Risk Assessment Algorithm via Lane-Based Probabilistic Motion Prediction of Surrounding Vehicles," in IEEE Transactions on Intelligent Transportation Systems, vol. 19, No. 9, pp. 2965-2976, Sep. 2018, doi: 10.1109/TITS.2017.2768318. (Year: 2018).*

(Continued)

*Primary Examiner* — Ramon A. Mercado
*Assistant Examiner* — Ellis B. Ramirez
(74) *Attorney, Agent, or Firm* — ROSSI, KIMMS & McDOWELL LLP

(57) ABSTRACT

A control system (10) is suitable for use in one's own motor vehicle (12) and is set up and intended to determine the current driving situation of one's own motor vehicle (12) and other motor vehicles (28, 40) in the surroundings of one's own motor vehicle (12) by means of a surroundings sensor system and to assign the other motor vehicles (28, 40) to specific movement paths or not. The control system is set up and intended based on the surroundings data provided to determine at least one path property for a future movement path of one's own motor vehicle (12), based on the surroundings data provided for every other motor vehicle (28, 40) in the surroundings of one's own motor vehicle (12) and in relation to at least two reference points of the respective other motor vehicle (28, 40) to determine a state vector, to (Continued)

transform the respectively determined state vector for each of the other motor vehicles (28, 40) into path coordinates and based on the at least one path property for one's own motor vehicle (12) and, to determine based on the respective transformed state vector, a probability distribution of a position of each of the other motor vehicles (28, 40) corresponding to each of the at least two reference points of the respective other motor vehicle (28, 40).

12 Claims, 10 Drawing Sheets

(51) Int. Cl.
  *B60W 40/04* (2006.01)
  *B60W 50/00* (2006.01)
  *G08G 1/16* (2006.01)

(52) U.S. Cl.
  CPC .............. *G08G 1/012* (2013.01); *G08G 1/166* (2013.01); *B60W 2050/0016* (2013.01); *B60W 2050/0037* (2013.01)

(58) Field of Classification Search
  CPC ......... B60W 50/00; B60W 2050/0016; B60W 2050/0037; B60W 2520/10; B60W 2520/14; B60W 2540/18; B60W 2552/50; B60W 2552/53; B60W 60/00272

USPC .................. 701/117, 301, 302; 340/933, 938
  See application file for complete search history.

(56) References Cited

U.S. PATENT DOCUMENTS

| | | | | |
|---|---|---|---|---|
| 2012/0053755 | A1* | 3/2012 | Takagi | G01S 7/4808 |
| | | | | 701/1 |
| 2015/0154328 | A1* | 6/2015 | Michalke | G06F 30/20 |
| | | | | 703/1 |
| 2016/0103218 | A1* | 4/2016 | Mandava | B60Q 5/006 |
| | | | | 701/301 |
| 2017/0162049 | A1* | 6/2017 | Lee | G08G 1/0112 |
| 2017/0345182 | A1* | 11/2017 | Sano | G06T 7/73 |
| 2018/0178790 | A1* | 6/2018 | Oguri | G08G 1/16 |
| 2018/0217603 | A1 | 8/2018 | Kwon et al. | |
| 2018/0231974 | A1* | 8/2018 | Eggert | B60W 60/0027 |
| 2018/0374235 | A1* | 12/2018 | Kamata | G06V 20/58 |
| 2019/0111874 | A1* | 4/2019 | Harada | G01S 13/588 |
| 2019/0333386 | A1* | 10/2019 | Horita | G08G 1/166 |
| 2021/0031800 | A1* | 2/2021 | Fuchs | G08G 1/163 |
| 2021/0139023 | A1* | 5/2021 | Crego | B60W 60/00276 |

FOREIGN PATENT DOCUMENTS

| | | | | |
|---|---|---|---|---|
| DE | 102012000949 A1 | * | 7/2013 | ............ B60W 50/14 |
| DE | 102016218080 | | 8/2017 | |
| DE | 102016218080 B3 | * | 8/2017 | |
| DE | 102017213029 | | 1/2019 | |
| DE | 102017213029 B3 | * | 1/2019 | |
| JP | 2011170762 A | * | 9/2011 | |
| KR | 101503473 B1 | * | 3/2018 | |
| WO | 2019206378 | | 10/2019 | |

OTHER PUBLICATIONS

Machine Translation of DE-102017213029-B3, Rodloff C.,Prediction of the Development of a Traffic Situation, Jan. 17, 2019 (Year: 2019).*

* cited by examiner

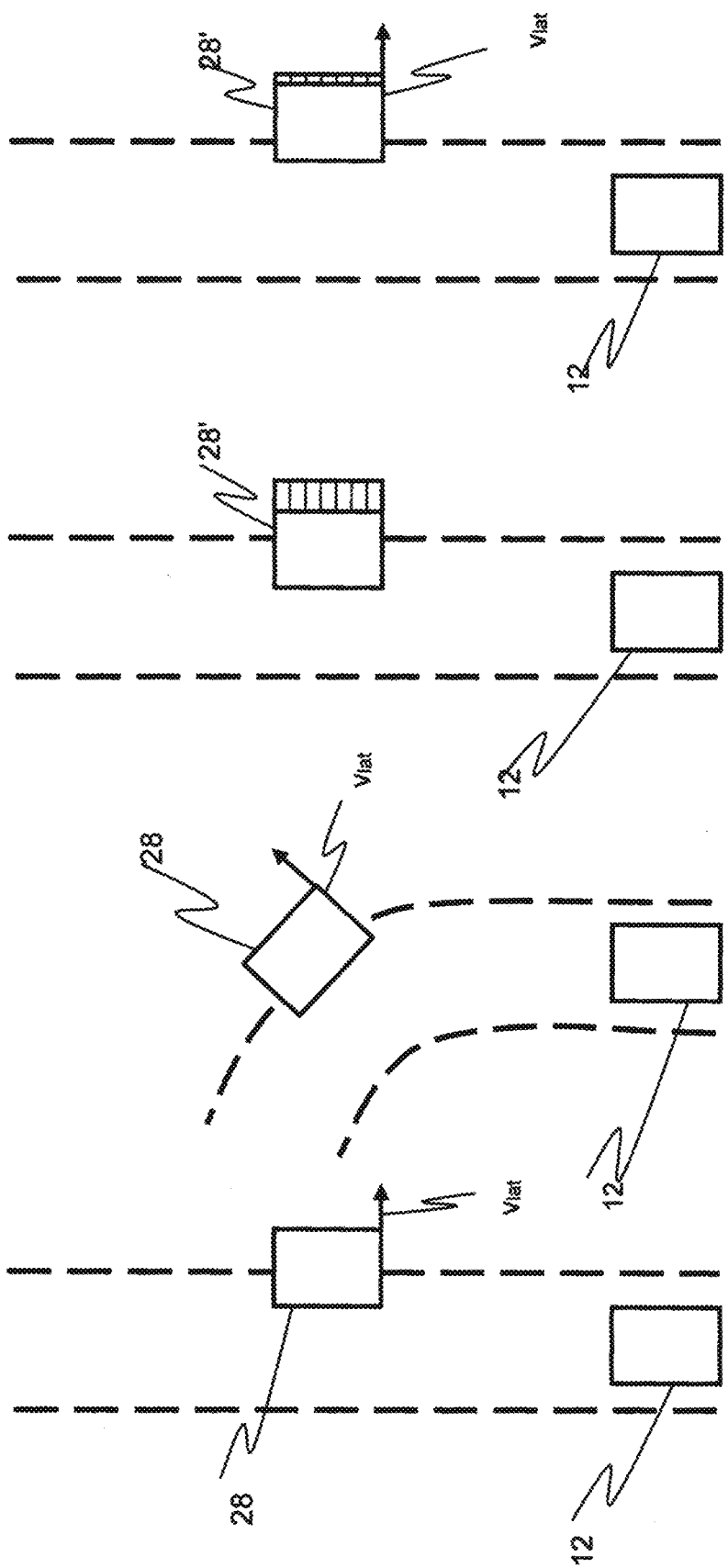

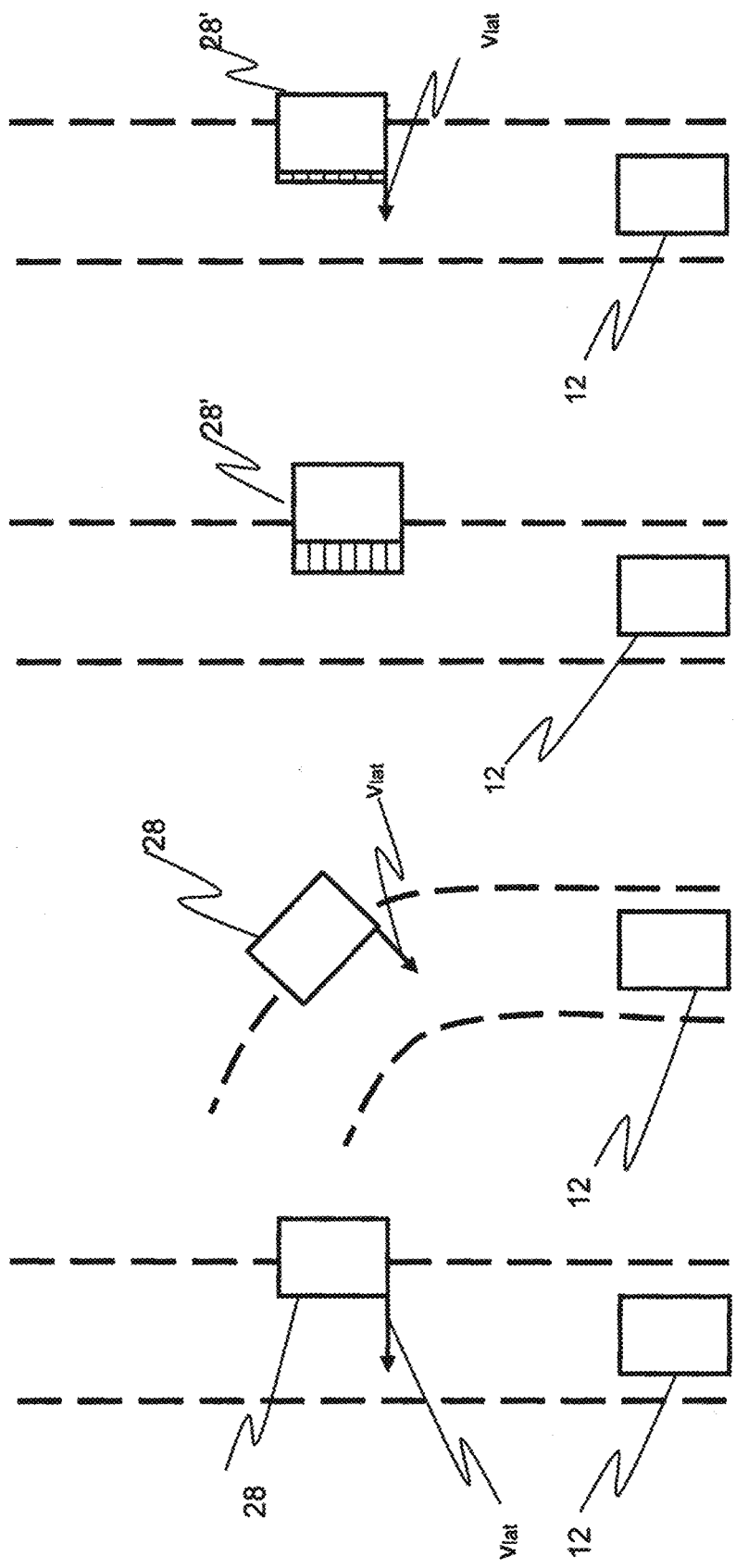

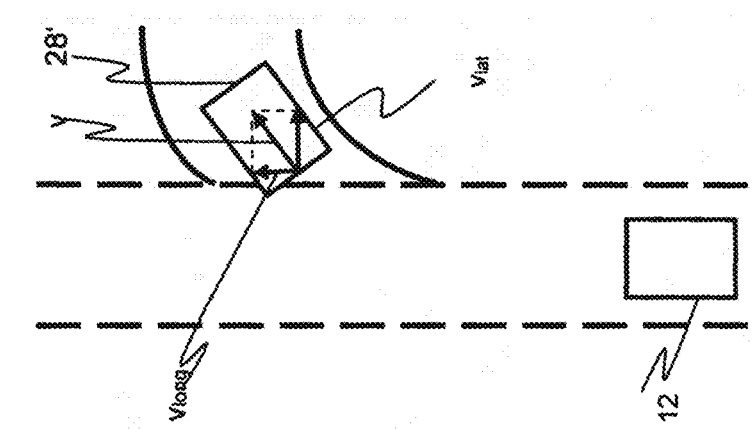
FIG. 8c
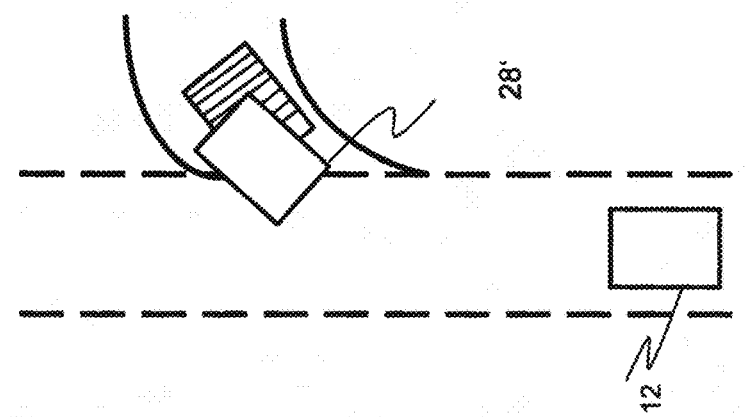
FIG. 8b
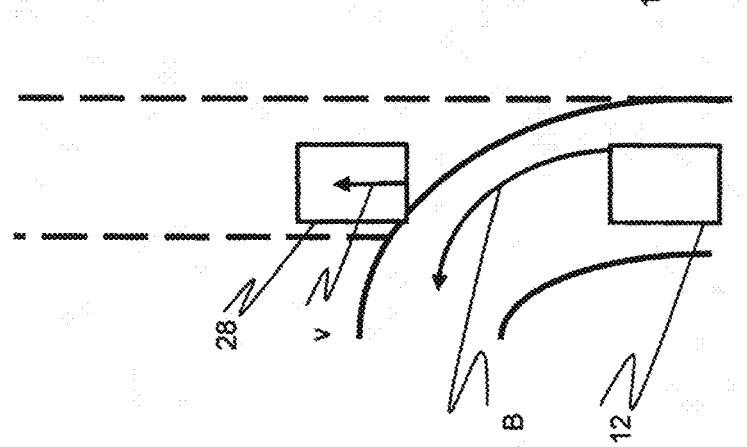
FIG. 8a
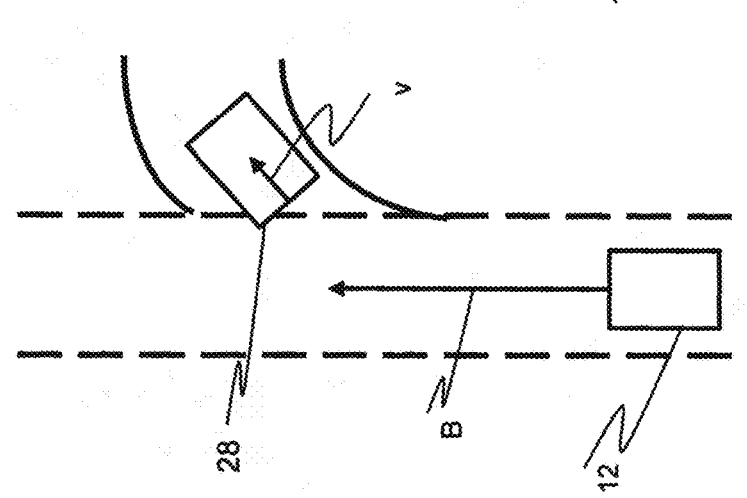

CONTROL SYSTEM AND CONTROL METHOD FOR PATH ASSIGNMENT OF TRAFFIC OBJECTS

RELATED APPLICATION

This application claims priority from German Application No. 10 2019 107 411.8 filed Mar. 22, 2019, the subject matter of which is incorporated herein by reference in its entirety.

BACKGROUND OF THE INVENTION

A control system and a control method for one's own motor vehicle are described here in order to assign other traffic objects to specific movement paths. The control system and the control method are based in particular on a surroundings sensor system in one's own motor vehicle and support a driver or an autonomously driving motor vehicle. In the case of semiautonomous motor vehicles and autonomously controlled motor vehicles, it helps to increase the safety and driving comfort of the occupants of the motor vehicle by improving the selection of other motor vehicles, to which one's own motor vehicle is to react in a particular driving situation, based on the assignment of movement paths.

PRIOR ART

The detection of certain traffic situations and their correct interpretation is a main aspect in the development of (partially) autonomous motor vehicles today.

Driver assistance systems (FAS for short) offer a multitude of monitoring and information functions to make driving such a motor vehicle safer and more comfortable. For this purpose, the surroundings of the motor vehicle are monitored based on the surroundings data obtained from one or more surroundings sensors located on the motor vehicle with regard to the course of the journey of the motor vehicle.

Known driver assistance systems determine, for example, whether the motor vehicle is in a lane and whether the driver unwantedly drifts to one side of the lane or is about to leave it. These driver assistance systems generate an "image" of the roadway and in particular the lane from the surroundings data obtained. Objects are recognized and tracked while driving, such as a curb, lane boundary lines, directional arrows, etc.

So-called "blind spot monitors" are also part of today's driver assistance systems. These determine, for example by means of radar, lidar, video or the like, whether there is another motor vehicle, a roadway user or an object to the side and/or behind the motor vehicle, so that changing lanes or turning the motor vehicle could lead to a collision with another motor vehicle.

Furthermore, in so-called ACC systems (Adaptive Cruise Control) an automatic speed control of the motor vehicle is adapted to the speed of a motor vehicle in front. A certain distance from the motor vehicle in front should always be maintained. For this purpose, ACC systems determine a direction of movement and/or a speed of the motor vehicle in front in order to avoid the motor vehicle crossing the path of the motor vehicle in front in such a way that a critical situation arises. This affects lane changes or turning processes on the one hand and rear-end collisions on the other.

As part of such ACC systems or as separate driver assistance systems, there are also emergency braking assistants (AEB—Automatic Emergency Braking and/or CMB—Collision Mitigation Braking) to automatically initiate an emergency braking procedure in dangerous situations such as an impending collision with an obstacle in front of the motor vehicle. This is intended to avoid the impact entirely, but alternatively to at least reduce the speed of impact of the motor vehicle to the obstacle as far as possible.

In motor vehicles driven by people, the driver assistance systems usually offer an advisory function to warn the driver of a critical situation or a corresponding maneuver, or to propose a suitable maneuver for the motor vehicle to the driver. Likewise, the driver assistance systems can also be used in autonomously controlled motor vehicles in order to provide the corresponding surroundings data to the autonomous control.

Underlying Problem

Situations can arise in roadway traffic that require a driver or a (partially) autonomous driver assistance system of a motor vehicle to perform a driving maneuver. For example, a curve-shaped lane course can already require a corresponding driving maneuver of the motor vehicle.

However, the current situation of one's own motor vehicle is not constant, but is constantly changing in reality. For example, other roadway users can intentionally or unintentionally change lanes or change speed due to an accident. In addition, the current driving situation of the motor vehicle is already changing due to the driver's own driving behavior and/or the changing lane course. Reacting appropriately and in good time to such changes in the current situation is a major challenge for both conventional driver assistance systems and human drivers.

In the driver assistance systems mentioned at the beginning, such as ACC, AEB, CMB and "dead-angle monitors" that react to other roadway users in the area surrounding the motor vehicle, one or more objects, for example one of the other roadway users, must be selected by a control underlying the corresponding driver assistance system or be transmitted to it. The driver assistance system can then react to this or these several objects as the motor vehicle continues to travel.

With regard to ACC systems, this process is usually referred to as object selection (English: track selection or target selection or target object selection). An important aspect in the selection of objects is the assignment of the objects to a movement path currently traveled by the motor vehicle. This movement path has a known past part and a future unknown part, which can only be estimated.

For this purpose, for example, an estimated, merged and filtered path is determined from all available sensor information (which is obtained from the surroundings sensors and/or from further sensors inside the vehicle). Objects in the surroundings of the motor vehicle can then be assigned to this path, for example by geometrically superimposing the estimated path and the detected objects or by determining the overlap probability of the estimated path and the detected objects. As a rule, the path and the objects are filtered and later superimposed. This means that already filtered parameters are merged, which does not take dynamic object uncertainties into account. In addition, complex calculations are required to determine the likelihood of overlap, since these can have any shape and, as a rule, cannot be calculated in a closed form.

The object is therefore to provide a control system and a control method for a motor vehicle in order to assign objects in the surroundings of the motor vehicle to a future movement path of the motor vehicle in a most efficient and exact manner, even if the movement path is subject to rapid fluctuations. The fast and exact assignment of the objects to the future movement path thus increases driving safety and driving comfort for people within the motor vehicle in accordance with a current traffic situation in which the motor vehicle finds itself.

Suggested Solution

This object is achieved by a control system with the features of claim 1 and a control method with the features of claim 9.

Preferred embodiments are evident from subclaims 2 to 8 and 10 and the description shown below.

One aspect relates to a control system that is set up and intended for use in one's own motor vehicle. This control system detects lanes, roadway boundaries, roadway markings and/or other motor vehicles based on surroundings data obtained from at least one surroundings sensor assigned to one's own vehicle. The at least one surroundings sensor is set up to provide to an electronic control unit of the control system surroundings data representing the area in front of, to the side of and/or behind one's own motor vehicle. The control system is at least set up and intended to:
 determine at least one path property for a future movement path of one's own motor vehicle based on the surroundings data provided;
 determine a state vector based on the surroundings data provided for each other motor vehicle in the surroundings of one's own motor vehicle and in relation to at least two reference points of the respective other motor vehicle;
 transform the respectively determined state vector for each of the other motor vehicles into path coordinates based on the at least one path property for one's own motor vehicle, and
 determine a probability distribution of a position of each of the other motor vehicles corresponding to each of the at least two reference points of the respective other motor vehicle based on the transformed state vector.

The control system can determine the probability distributions of the position of each of the other motor vehicles per reference point independently of one another. Furthermore, the probability distributions of the position of each of the other motor vehicles per reference point can be determined one after the other or simultaneously by the control system.

The movement path for one's own motor vehicle can follow a lane currently being traveled by one's own motor vehicle. Alternatively, it is conceivable that the movement path extends over a plurality of lanes of a roadway currently being used by one's own motor vehicle, for example when one's own motor vehicle executes an entry, an exit or an overtaking procedure.

The control system can determine the two reference points, for example, as being located on two outermost regions of the body of the corresponding other motor vehicle.

In this way it is possible to map a length and/or a width of the corresponding other motor vehicle over the distributions of the at least two reference points and to model the corresponding other motor vehicle as an extended object.

The state vector transformed into path coordinates may include lateral and/or longitudinal parameters, but the present disclosure is not limited thereto. The direction vectors of the lateral parameters in path coordinates can run orthogonally to the movement path of one's own motor vehicle. The direction vectors of the longitudinal parameters can follow the movement path of one's own motor vehicle.

In certain embodiments, the at least one path property can contain only raw measurement data and/or can contain at least one of the following parameters:
 a yaw rate of one's own motor vehicle;
 a steering angle of one's own motor vehicle;
 a speed of one's own motor vehicle;
 lane markings and/or roadway boundaries of a roadway currently being used by one's own motor vehicle; and
 one or more future movement paths and/or stopping points of one or more future movement paths of one or more of the other motor vehicles and/or one's own motor vehicle.

The speed of one's own motor vehicle can be a longitudinal and/or a lateral speed and/or a combined lateral and longitudinal speed of one's own motor vehicle.

The yaw rate and/or the steering angle can be determined by the control system from in-vehicle sensor information of one's own motor vehicle. For this purpose, one's own motor vehicle has appropriate sensors such as one or more wheel speed sensors and/or an inertial sensor. In such cases, these sensors are coupled to the control system and make the measured sensor information available to the control system.

Since all the data contained in the path property can be raw measurement data, any sensor that supplies data for the path property can supply this data in the respective output format of the corresponding sensor. This applies, for example, to the yaw rate and the speed of one's own motor vehicle, the data of which can describe circular arcs, as well as the roadway boundaries and roadway markings, which are available, for example, as polynomials.

The roadway boundaries can be, for example, floor markings, but also guardrails or curbs. The roadway boundaries and/or the roadway markings can be determined or received by the control system based on the surroundings data provided, for example as third order polynomials.

All or some of the parameters of the path property can be in the form of probability distributions, for example in the form of an average and a variance. The variance can be a covariance.

In certain embodiments, the control system can also be set up and intended to determine the at least two reference points for each of the other motor vehicles as reference points on the left and right rear areas of the corresponding other motor vehicle.

In these cases, the reference points on the left and right rear areas of the other motor vehicle can in particular be determined as areas located on the outermost edges of the rear of the corresponding other motor vehicle.

In certain embodiments, the at least two reference points may include four reference points for each of the other motor vehicles. The control system can then also be set up and intended to determine the four reference points for each other motor vehicle as reference points on the left and right rear areas and on the left and right front areas of the corresponding other motor vehicle.

In these cases, the reference points on the left and right rear areas and on the left and right front areas of the other motor vehicle can in particular be located on the areas located on the outermost edges of the rear of the corresponding other motor vehicle or on the areas located on the outermost edges of the front of the corresponding other motor vehicle.

The control system can also be set up and intended to filter the transformed state vector of each of the other motor vehicles using a multidimensional probability-based filter unit.

This can be, for example, filtering with a constant speed model and/or a constant acceleration model in the lateral and/or longitudinal direction.

The filter unit can be a continuous and/or a discrete Bayesian filter. The Bayesian filter can be designed, for example, as a Kalman filter.

The control system can also be set up and intended to determine the probability distribution of the position of each of the other motor vehicles based on the filtered state vector of each of the other motor vehicles as a probability distribution of a lateral position and/or as a probability distribution of a longitudinal position of the corresponding other motor vehicle corresponding to each of the at least two reference points of the corresponding other motor vehicle in path coordinates, to estimate the probability distribution of the lateral position and/or the probability distribution of the longitudinal position corresponding to each of the at least two reference points of the corresponding motor vehicle to an individual value by means of an estimation unit and to determine, based on the estimated individual values for the corresponding other motor vehicle, whether or not the corresponding other motor vehicle is assigned to the movement path for one's own motor vehicle.

In such cases, the other motor vehicles, which are not assigned to the movement path of one's own motor vehicle, can be assigned to a movement path that is adjacent to and/or runs parallel to this movement path. The adjacent/parallel movement paths can be located on both sides of the movement path of one's own motor vehicle. Alternatively, it is conceivable that some of the other motor vehicles are not assigned to a movement path.

In this way, the lateral and/or longitudinal position distributions contained in the state vector are filtered as late as possible in relation to the process of path assignment (also called path allocation) carried out by the control system, and in particular after the transformation of the state vector. This filters a final quantity, which helps to avoid discontinuities. This also avoids an interim determination of the movement path based on already filtered parameters. This makes it possible to filter the dynamics of the movement path and the dynamics of the other motor vehicles in connection with one another. The filter unit automatically adapts to the uncertainties of the other motor vehicles and the at least one path property.

In certain embodiments, the control system can also be set up and intended to determine the state vector for each of the other motor vehicles as raw measurement data. Alternatively or additionally, the state vector for each of the other motor vehicles can contain one or more of the following parameters:
- a lateral position of the corresponding other motor vehicle;
- a lateral speed of the corresponding other motor vehicle;
- a lateral acceleration of the corresponding other motor vehicle;
- a longitudinal position of the corresponding other motor vehicle;
- a longitudinal speed of the corresponding other motor vehicle;
- a longitudinal acceleration of the corresponding other motor vehicle;
- a vehicle width of the corresponding other motor vehicle; and
- a vehicle length of the corresponding other motor vehicle.

The state vector can also contain a steering angle and/or a yaw angle of the corresponding other motor vehicle. All the parameters contained in the state vector, with the exception of the vehicle width and the vehicle length of the corresponding other motor vehicle, can relate to the movement path of one's own motor vehicle. These parameters can be determined in vehicle-fixed coordinates, for example in relation to one's own motor vehicle.

The movement path itself can be a movement path determined or estimated by means of the yaw rate and/or the speed of one's own motor vehicle. Alternatively or additionally, the movement path can be a movement path determined or estimated by means of roadway markings and/or roadway boundaries.

The movement path can be identified by a path index. In these cases, the movement paths parallel and/or adjacent to the movement path can also be identified by path indices.

In certain embodiments, the control system can further be set up and intended to select one or more of the other motor vehicles from all other motor vehicles assigned to the movement path for one's own motor vehicle in accordance with one or more predetermined conditions; and to provide the selection in the form of data to one or more driver assistance systems of one's own motor vehicle.

The driver assistance systems of one's own motor vehicle can be, for example, an ACC system, an AEB system, a "blind spot monitor" and/or a CMB system.

The one or more predetermined conditions can be, for example, exceeding or reaching a threshold value/threshold values with regard to the probability distribution of the lateral and/or the longitudinal position.

Alternatively or additionally, the one or more predetermined conditions can be the smallest distance in the longitudinal and/or lateral direction and/or lateral and longitudinal direction from one's own motor vehicle in comparison with the other motor vehicles.

Alternatively or additionally, the predetermined condition can be a probability that the corresponding other motor vehicle will carry out a certain driving maneuver, such as an entry or exit procedure.

In other words, the control system of one's own motor vehicle can in particular select the other motor vehicle that is at the smallest distance from one's own motor vehicle. This smallest distance can be a smallest lateral, a smallest longitudinal or a smallest combined lateral and longitudinal distance between one's own motor vehicle and the selected other motor vehicle.

The selection as to whether or not another motor vehicle in the surroundings of one's own motor vehicle is assigned to the movement path of one's own motor vehicle (path assignment) can therefore be based on raw measurement data determined in vehicle-fixed coordinates, which are first transformed into (curvilinear) path coordinates and then filtered using the filter unit. The accuracy of the selection is improved by including lateral speeds and/or lateral accelerations in the state vector. In conjunction with ACC systems, their functions, for example maintaining a constant distance from a motor vehicle in front, are also improved by including in the state vector longitudinal speed and acceleration parameters of the motor vehicle in front. By combining lateral and longitudinal acceleration and/or speed parameters in the state vector, both the accuracy in the selection and the functions of ACC systems are improved.

By filtering the state vector and the at least one path property as late as possible and depending on one another, fluctuations due to sensor noise or rapidly changing surroundings of one's own motor vehicle can also be suppressed by the control system. The path assignment can thus be implemented in a robust manner and above all in situations (for example in the context of lane changes) in which a quick path assignment must take place. The dynamics of the movement path of one's own motor vehicle and the dynamics of the other motor vehicles are taken into account at the same time. Measurements of information contained in the state vector and/or in the path property are weighted on the basis of the uncertainties of the respective other motor vehicles in connection with their individual path property.

To determine the at least one path property and/or to determine the state vector, the control system can be set up and intended to cover distances between one's own motor vehicle and all other motor vehicles located in front of, to the side of and/or behind one's own motor vehicle in a traffic situation and to determine speed differences and/or acceleration differences between one's own motor vehicle and the other motor vehicles, it being possible for one's own motor vehicle and the other motor vehicles to be in the same lane and/or in adjacent lanes.

The determined distances, speed differences and/or acceleration differences between one's own motor vehicle and the other motor vehicles can be combined as desired by the control system and set in relation to one another. For example, these parameters can be used to determine at least parts of the state vector and/or the at least one path property.

It goes without saying that the control system can also be set up and intended to detect the other motor vehicles participating in traffic by means of the at least one surroundings sensor over a predetermined period of time or continuously. The surroundings data obtained by means of the at least one surroundings sensor change constantly in accordance with the actual traffic and driving situation and can be updated cyclically.

Thus, the control system can also determine changes in the previously described relative distances, speed differences and/or acceleration differences over a predetermined period of time or continuously for all other motor vehicles that are in a current traffic situation in the immediate surroundings of one's own motor vehicle.

For this reason, the control system and/or the filter unit according to probability theory can be set up to continuously update the at least one path property and/or the state vector, for example per measurement cycle of the information contained in the at least one path property and/or in the state vector. The filter unit can then carry out one or more further calculation steps based on this updated information.

A further aspect relates to a control method which, in one's own motor vehicle based on surroundings data obtained by at least one surroundings sensor(s) assigned to one's own motor vehicle detects lanes, roadway boundaries, roadway markings and/or other motor vehicles in an area in front of, to the side of and/or behind one's own motor vehicle. The control method is carried out in particular by means of a control system described above and comprises at least the following steps:

determining at least one path property for a future movement path of one's own motor vehicle based on the surroundings data provided;

determining a respective state vector for each other motor vehicle in the surroundings of one's own motor vehicle and in relation to at least two reference points of the other motor vehicle based on the surroundings data provided;

transforming the respectively determined state vector into path coordinates for each of the other motor vehicles based on the at least one path property for one's own motor vehicle, and determining a probability distribution of a position of each of the other motor vehicles corresponding to each of the at least two reference points of the respective other motor vehicle based on the transformed state vector.

Yet another aspect relates to a motor vehicle comprising a control system described above.

Compared to conventional driver assistance systems, the solution presented here improves correct assessment and correct recognition of the current traffic situation of one's own motor vehicle and other motor vehicles. Other motor vehicles in the surroundings of one's own motor vehicle can be quickly assigned to a movement path in a resource-saving manner or not. Due to the late filtering of the position information of the other motor vehicles, efficient noise suppression takes place. This makes the path assignment even more insensitive to any interference, particularly in driving situations with rapidly changing surroundings.

It is obvious to the person skilled in the art that the aspects and features described above can be combined as desired in a control system and/or a control method. While some of the features described above have been described in relation to a control system, it should be understood that these features can also apply to a control method. In the same way, the features described above in relation to a control method can apply to a control system in a corresponding manner.

BRIEF DESCRIPTION OF THE DRAWINGS

Further goals, features, advantages and possible applications result from the following description of non-restrictive exemplary embodiments with reference to the associated drawings. All of the features described and/or illustrated depict the subject matter disclosed here alone or in any combination. The dimensions and proportions of the components shown in the figures are not to scale. The same or equivalent components are provided with the same reference numerals.

FIGS. 5a to 5c schematically show an exit maneuver of a motor vehicle in front and various estimated positions of the motor vehicle in front according to certain exemplary embodiments.

FIGS. 6a to 6c schematically show an entry maneuver of a motor vehicle in front and various estimated positions of the motor vehicle in front according to certain exemplary embodiments.

FIGS. 8a to 8c schematically show a follow-up drive of one's own motor vehicle behind a motor vehicle in front in turning situations or respectively various estimated positions of the motor vehicle in front according to certain exemplary embodiments.

DETAILED DESCRIPTION OF THE DRAWINGS

In the following disclosure, certain aspects are primarily described with reference to the control system. However, these aspects are of course also valid in the context of the disclosed control method, which can be carried out, for example, by a central control device (ECU) of a motor vehicle. This can be done by making suitable write and read accesses to a memory assigned to the motor vehicle. The control method can be implemented in the motor vehicle both in hardware and software and also in a combination of hardware and software. This also includes digital signal processors, application-specific integrated circuits, field programmable gate arrays and other suitable switching and computing components.

Figure 1:
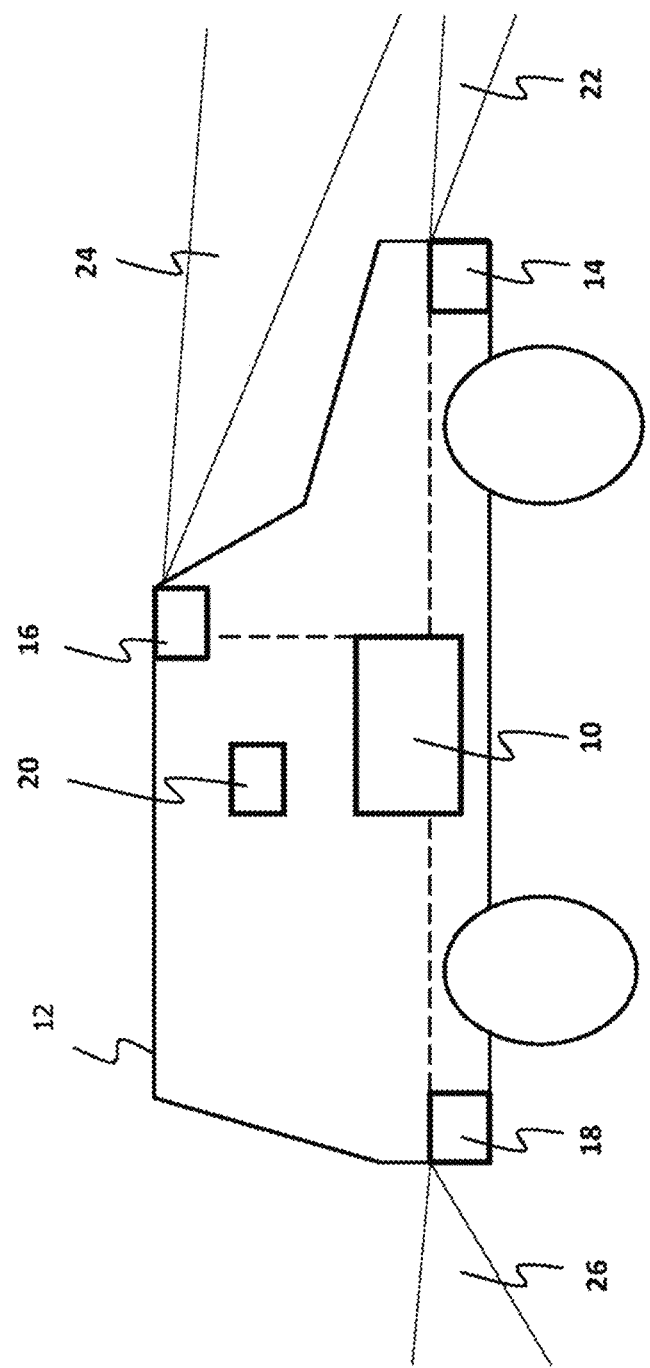
FIG. 1 schematically shows a motor vehicle with a control system and at least one surroundings sensor in accordance with certain exemplary embodiments.

FIG. 1 schematically shows a motor vehicle 12 (hereinafter also referred to as one's own motor vehicle 12), which comprises a control system 10. The control system 10 is coupled to at least one surroundings sensor 14, 16, 18 located on the motor vehicle 12 in order to receive surroundings data from the at least one sensor 14, 16, 18. The control system 10 can comprise an electronic control unit ECU (Electronic Control Unit; not shown in the figure). For example, the present control system 10 can at least be set up and intended to determine a path property for a future movement path of one's own motor vehicle 12 with the aid of the ECU and/or further electronic control systems and to assign one or more other objects (for example other motor vehicles) to the future movement path which are in the current driving situation of one's own motor vehicle 12 in its surroundings. For example, the ECU receives signals from the surroundings sensors 14, 16, 18, processes these signals and the associated surroundings data and generates control and/or output signals.

FIG. 1 shows three surroundings sensors 14, 16, 18 which send corresponding signals to the control system 10 or the electronic control unit ECU. In particular, at least one surroundings sensor 14, which is directed forward in the direction of travel of the motor vehicle 12 and which detects an area 22 in front of one's own motor vehicle 12, is arranged on one's own motor vehicle 12. This at least one surroundings sensor 14 can be arranged, for example, in the area of a front bumper, a front lamp and/or a front radiator grille of one's own motor vehicle 12. The surroundings sensor 14 thereby detects an area 22 directly in front of one's own motor vehicle 12.

At least one additional or alternative surroundings sensor 16, which is also directed forward in the direction of travel of one's own motor vehicle 12, is shown in the area of a front window of the motor vehicle 12. For example, this surroundings sensor 16 can be arranged between an inner rear-view mirror of one's own motor vehicle 12 and its front window. Such a surroundings sensor 16 detects an area 24 in front of one's own motor vehicle 12, and depending on the shape of motor vehicle 12, an area 24 directly in front of the motor vehicle 12 cannot be detected due to the front section (or its geometry) of one's own motor vehicle 12.

Furthermore, at least one surroundings sensor 18 can be arranged to the side and/or at the rear of one's own motor vehicle 12. This optional surroundings sensor 18 detects an area 26 that lies to the side and/or in the direction of travel of one's own motor vehicle 12 behind the motor vehicle 12. For example, the data or signals from this at least one surroundings sensor 18 can be used to verify information detected by the other surroundings sensors 14, 16 and/or to determine a curvature of a lane or roadway traveled by one's own motor vehicle 12.

The at least one surroundings sensor 14, 16, 18 can be implemented as desired and comprise a front camera, a rear camera, a side camera, a radar sensor, a lidar sensor, an ultrasound sensor and/or an inertial sensor. For example, the surroundings sensor 14 can be implemented in the form of a front camera, a radar, lidar, or ultrasound sensor. A front camera is particularly suitable for the higher-level surroundings sensor 16, while the surroundings sensor 18 arranged in the rear of one's own motor vehicle 12 can be implemented in the form of a rear camera, a radar, lidar, or ultrasound sensor.

The electronic control unit ECU processes the surroundings data obtained from the surroundings sensor(s) 14, 16, 18 located on one's own motor vehicle 12 in order to provide information regarding the static surroundings (immovable surrounding objects such as roadway boundaries) and the dynamic surroundings (movable surrounding objects such as other motor vehicles or other roadway users) of the motor vehicle 12.

For example, the electronic control unit processes the surroundings data obtained from the surroundings sensor(s) 14, 16, 18 located on one's own motor vehicle 12 in order to detect a traffic lane traveled by the motor vehicle 12 with a first and a second lateral lane boundary in front of one's own vehicle 12. In addition, the electronic control unit ECU processes the surroundings data obtained from the surroundings sensor(s) 14, 16, 18 located on one's own motor vehicle 12 in order to detect lanes occupied by other objects (which are adjacent to the lane traveled by one's own motor vehicle 12, whereby adjacent means that one or more further lanes can also lie between the adjacent lanes) and their lateral lane boundaries in front of, to the side of and/or behind one's own motor vehicle 12. The other objects are, in particular, other motor vehicles that move along the lanes adjacent to one's own motor vehicle's 12 lane.

For this purpose, the surroundings sensors 14, 16, 18 of the electronic control unit ECU provide the surroundings data representing the area in front of, to the side of and/or behind one's own motor vehicle 12. For this purpose, the control system 10 is connected to the at least one surroundings sensor 14, 16, 18 via at least one data channel or bus (shown in dashed lines in FIG. 1). The data channel or bus can be implemented using cables or wirelessly.

As an alternative or in addition, the control system 10 or its electronic control unit ECU can also receive data from one or more other assistance systems 20 or another electronic control unit 20 of one's own motor vehicle 12, which includes the lanes traveled by one's own motor vehicle 12 and the other motor vehicles specify their lateral lane boundaries, or can be derived from them. Data and information already determined by other systems can thus be used by the control system 10.

Furthermore, the control system 10 or its electronic control unit ECU determines a current traffic situation (also driving situation) with the surroundings sensors, i.e. on the basis of the surroundings data obtained with the aid of the at least one surroundings sensor 14, 16, 18. Here too, as an alternative or in addition, an already existing assistance system 20 or an electronic control unit 20 can supply data and/or information that define a driving situation or from which a driving situation can be derived quickly. Depending on the determined driving situation, the control system 10 then determines a path property for a future movement path for one's own motor vehicle 12 and the other objects located in the surroundings of one's own motor vehicle 12 can then be assigned to this movement path or not.

Additionally or alternatively, it is possible to assign objects that are not assigned to the movement path for one's own motor vehicle 12 to a movement path adjacent to this movement path. There is also the possibility that a certain object is not assigned to any movement path.

The information obtained from the surroundings data and made available to the control system 10 include, for example, in addition to the roadway boundaries and/or markings mentioned, positions and/or speeds and/or accelerations of one's own motor vehicle 12 and/or the other motor vehicles in each case in lateral, longitudinal or a combination of lateral and longitudinal directions. Furthermore, this information includes, for example, relative speeds and/or relative accelerations between one's own motor vehicle 12 and the other motor vehicles in the respective abovementioned directions.

In addition, the information obtained from the surroundings data can contain one or more future movement paths derived and ascertained by the control system 10 and/or stopping points of such movement paths. These movement paths and/or stopping points can relate to one or more of the objects in the surroundings of one's own motor vehicle 12 or to one's own motor vehicle 12 itself.

The driver assistance system 20 or the electronic control unit 20 can also be set up and intended to partially (autonomously) control one's own motor vehicle 12. In this case, the control system 10 is set up and intended to output data to the driver assistance system 20 or the electronic control unit 20 for autonomous driving. In particular, the control system 10 (or its ECU) can output data to the component 20 which identify which of the objects are assigned to the movement path for one's own motor vehicle 12. In addition, the control system 10 can select one or more of these objects based on predetermined conditions and output this selection to the component 20. This data can be transmitted via cables or wirelessly transmitted over a data channel or bus.

The principle of path assignment used in the context of the present disclosure is described below with reference to FIGS. 2 and 3. In other words, with reference to FIGS. 2 and 3, it is described how a movement path B for one's own motor vehicle 12 is determined and how an object in the surroundings of one's own motor vehicle 12 is assigned to the movement path for one's own motor vehicle in a current driving situation or not (path assignment).

Figure 2:
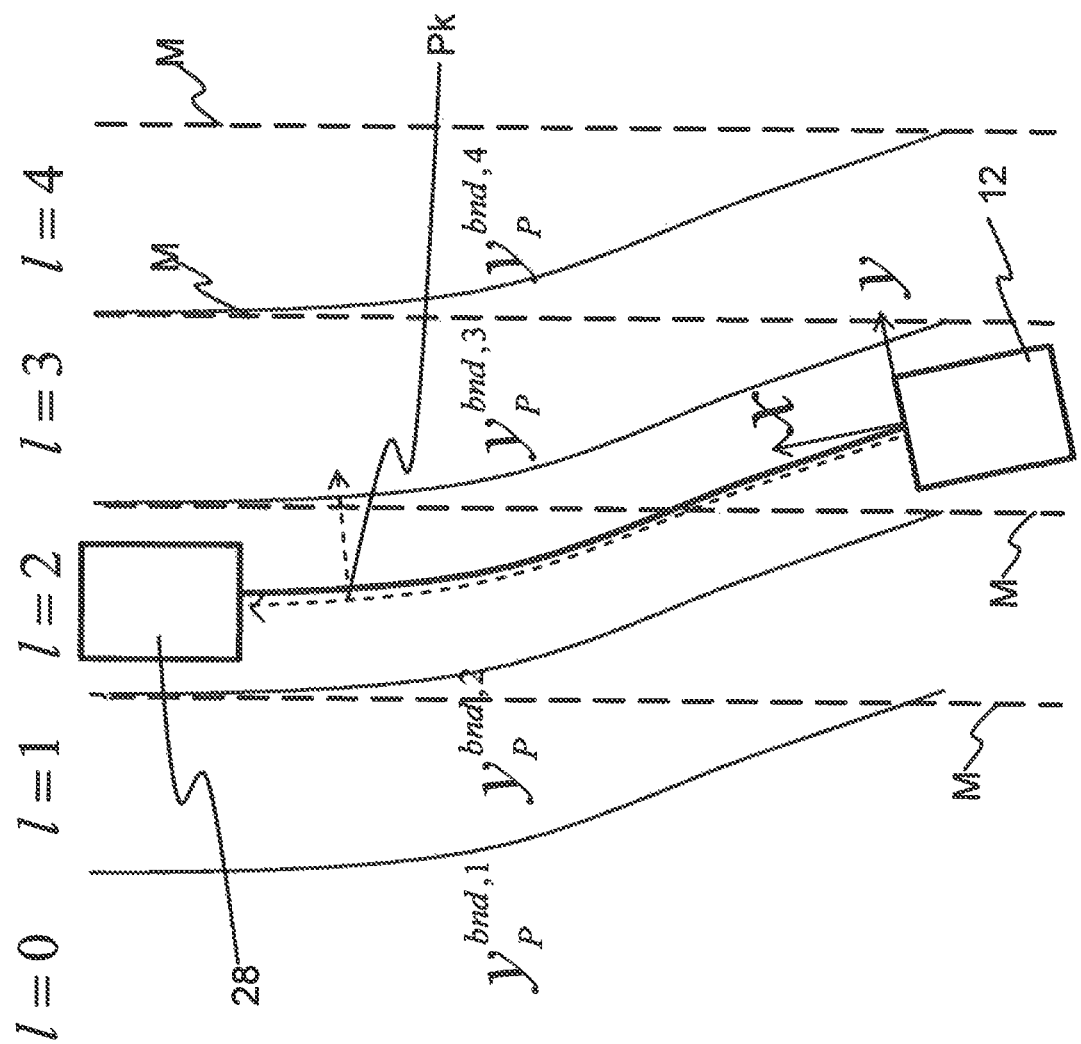
FIG. 2 schematically shows a driving situation in which one's own vehicle follows another vehicle on a multi-lane roadway according to certain embodiments.

A total of four lane markings provided with the reference symbol M are shown in FIG. 2. One's own motor vehicle 12, which is driving behind another motor vehicle 28, is currently located within the two inner lane markings M. The movement path B for one's own motor vehicle 12 extends between one's own motor vehicle 12 and the other motor vehicle 28 and crosses one of the lane markings M. If one's own motor vehicle follows this movement path B (shown only by way of example in FIG. 2), it will change lanes to the lane on the left from the point of view of the lane currently being used by one's own motor vehicle 12.

The movement path B of one's own motor vehicle 12 therefore does not have to match a lane of one's own motor vehicle 12 currently being used; however, this can be the case. However, it is also conceivable that the movement path B extends over a plurality of lanes, in particular adjacent lanes. This is the case in the example according to FIG. 2, where the movement path B of one's own motor vehicle 12 begins within the middle lane and ends within the left lane. In other cases, there can be a correspondence between the movement path B of one's own motor vehicle 12 and the lane it is currently traveling on, in particular when one's own motor vehicle 12 is driving straight ahead in the lane currently being traveled and does not perform any lane change or a similar maneuver in the current driving situation.

With regard to the movement path B for one's own motor vehicle 12, a distinction is made between different coordinates in the context of this disclosure. On the one hand, these are vehicle coordinates that are defined in the x and y directions by a Cartesian coordinate system that is fixed to the vehicle in relation to one's own motor vehicle 12 (see the Cartesian coordinate system in FIG. 2, which has its origin in the middle of the front area of one's own motor vehicle 12). On the other hand, these are path coordinates which describe a coordinate system which is locally orthogonal to the Cartesian coordinate system fixed to the vehicle. The latter also has its origin in one's own motor vehicle 12 and has a curvilinear x-axis which follows the movement path B.

Each point on the movement path B of one's own motor vehicle 12 accordingly, like the point Pk shown by way of example in FIG. 2, consists of an x coordinate ($x_p$) along the movement path B and an associated y coordinate which is arranged orthogonally to the corresponding x coordinate.

The lateral path coordinates, $y_p^{bnd,1}$, $y_p^{bnd,2}$, $y_p^{bnd,3}$ and $y_p^{bnd,4}$ shown in FIG. 2 serve for delimiting the movement path B of one's own motor vehicle from adjacent lanes or from adjacent movement paths. This takes place in relation to the x coordinate of the movement path B, that is to say along this movement path. For example, the path coordinates $y_p^{bnd,1}$, $y_p^{bnd,2}$, $y_p^{bnd,3}$ and $y_p^{bnd,4}$ can for example specify predetermined values laterally to the movement path B.

The variables I=0 to I=4 shown in FIG. 2 are index variables of the movement path B of one's own motor vehicle 12 or movement paths adjacent to this movement path, which can be determined for all objects detected by the surroundings sensor system of one's own motor vehicle 12. In other words, a path identified by this index can be assigned to the respective other object via the respective index variable, which is determined for each of the other objects in the surroundings of one's own motor vehicle 12. Alternatively, the assignment can be made via absolute values, the respective paths then being identified by one or more lateral positions of the respective object in relation to the movement path B of one's own motor vehicle 12 instead of using an index variable. If this lateral position or these lateral positions are within one of the boundaries $y_p^{bnd,1}$, $y_p^{bnd,2}$, $y_p^{bnd,3}$ and $y_p^{bnd,4}$, the path identified by this boundary is assigned to this object.

Thus, in accordance with FIG. 2, the index variable I=1 or the path boundary $y_p^{bnd,1}$ indicate a path that is to the left of the path (identified with I=1 in FIG. 2), which borders on the left-hand side with the movement path of one's own motor vehicle 12. Similarly, the index variable I=4 or the path boundary $y_p^{bnd,4}$ indicates a path that is to the right of the path (identified with I=3 in FIG. 2), which is located on the right-hand side of the movement path of one's own motor vehicle 12. The index variable I=2 or the path boundaries $y_p^{bnd,2}$ (left) and $y_p^{bnd,3}$ (right) identify the movement path B of one's own motor vehicle 12.

To determine the movement path B for one's own motor vehicle 12, the control system 10 of one's own motor vehicle 12 can receive surroundings data from the at least one surroundings sensor 14, 16, 18. In addition, further vehicle-internal sensor information, such as a wheel speed and a vehicle speed derived therefrom and/or a yaw rate of one's own motor vehicle 12, can be included in the determination of the movement path B. In this case, one's own motor vehicle 12 has the appropriate sensors and communication interfaces in order to make this information available to the control system 10.

Figure 3:
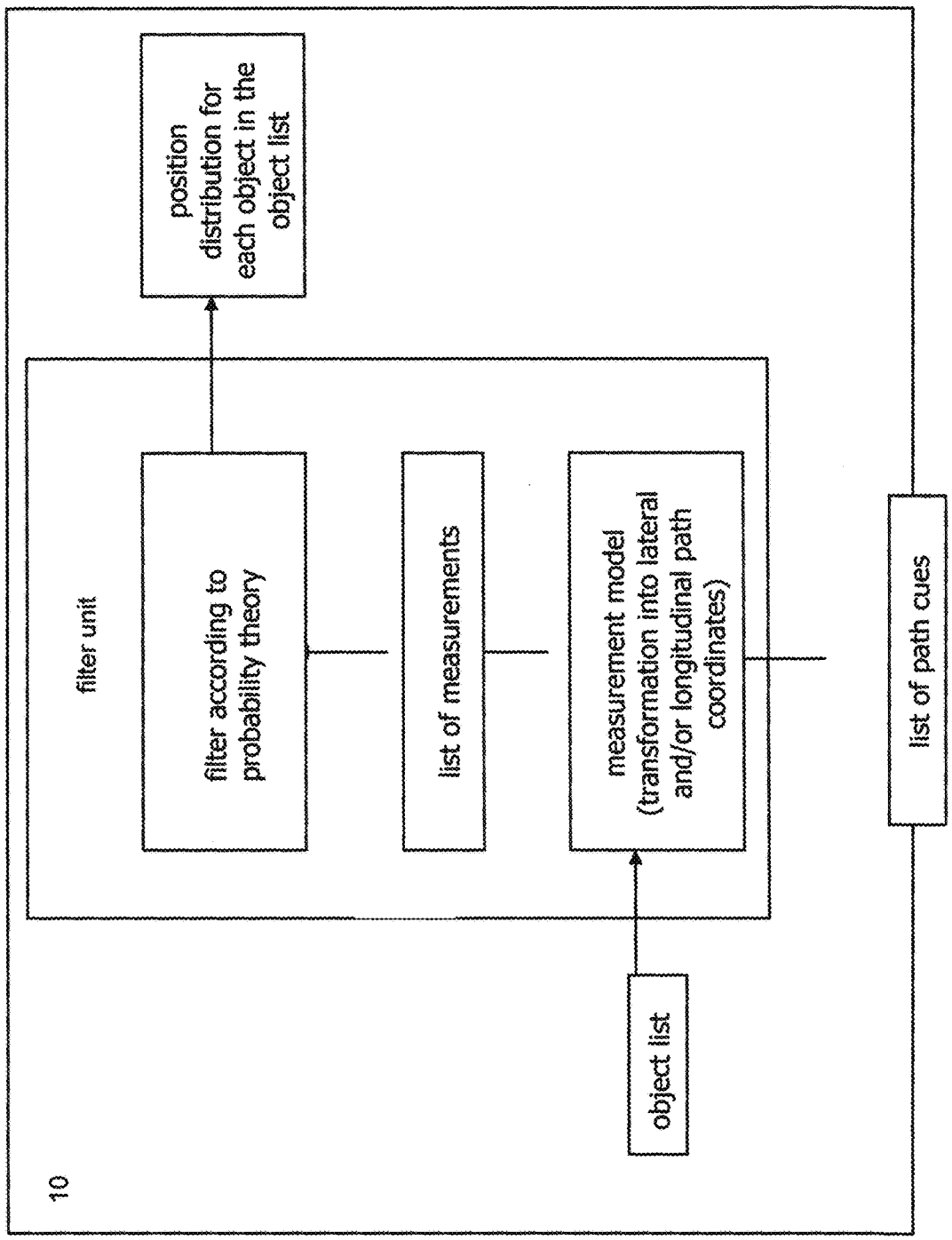
FIG. 3 schematically shows a filter unit of the control system for determining positional distributions of objects in the surroundings of one's own motor vehicle according to certain exemplary embodiments.

Next, reference is made to FIG. 3. A filter unit of the control system 10 is shown there. The movement path B for one's own motor vehicle 12 can in particular be determined within this filter unit. Furthermore, the control system 10 is set up to carry out the path assignment even without directly determining the movement path B using the filter unit.

As can be seen with reference to FIG. 3, different parameters are provided to the filter unit and there firstly to a measurement model. These parameters are different objects in the current surroundings of one's own motor vehicle 12 and information associated with these objects (object list). Furthermore, these parameters are different path cues. These path cues contain at least one path property of the movement path B for one's own motor vehicle 12. Within the scope of this disclosure, a path indication is also referred to as a path property.

The control system 10 is set up and intended to create the object list from the surroundings data of the at least one surroundings sensor 14, 16, 18. For this purpose, all objects in a current driving situation in the surroundings of one's own motor vehicle 12, in particular all other motor vehicles, are detected based on the surroundings data. All objects in the surroundings of one's own motor vehicle 12 can, but do not have to, be included in the object list. Alternatively, it is possible, for example, for the control system 10 to take into account for the object list only other motor vehicles such as the motor vehicle 28 (see FIG. 2) which, in the current driving situation, travels in front of one's own motor vehicle 12 in its currently used lane or a lane adjacent to it. In the example according to FIG. 2, the object list therefore only contains the other motor vehicle 28. However, the present disclosure is not limited thereto. Rather, in FIG. 2, as well as in the following figures, for the sake of clarity, no other motor vehicles are shown within a figure.

It is also conceivable for objects to be included in the object list which, in the current driving situation, are located to the side of and/or behind one's own motor vehicle 12.

In the object list, certain movement attributes are assigned to every other motor vehicle considered therein. This assignment is carried out in Cartesian coordinates fixed to the vehicle. The motion attributes include at least position and speed information. This can be relative and/or absolute position and speed information. Thus, the control system 10 determines the lateral distance of the other motor vehicle 28 (or its longitudinal axis) to one's own motor vehicle 12 and the longitudinal distance between the motor vehicles 12 and 28 for determining the current position of the other motor vehicle 28 therefrom.

Furthermore, the control system 10 determines the speed of the other motor vehicle 28, for example by deriving the position of the other motor vehicle 28 over time. The speeds determined by the control system 10 for the other motor vehicle 28 can be the longitudinal speed and/or the lateral speed of the other motor vehicle 12. Optionally, the lateral acceleration and/or the longitudinal acceleration of the other motor vehicle 28 can also be determined by the control system 10 and used for the object list.

All of these position, speed and/or acceleration parameters for the other motor vehicle 28 can be determined as absolute parameters. As an alternative and/or in addition, it is possible to determine and use probability distributions for each of these parameters in order to map uncertainties that cannot be detected by the surroundings sensor system, such as the influence of the driver of the other motor vehicle 28.

The object list to be determined by the control system 10 is accordingly one or more state vectors (the control system 10 can determine a state vector for another object) in which all other motor vehicles to be taken into account in the current driving situation of one's own motor vehicle 12 are included with their respective position, speed and/or acceleration information. Furthermore, the state vector can optionally include vehicle lengths, vehicle widths, a steering angle and/or a yaw angle of each of the other motor vehicles. The object list is made available to the measurement model of the filter unit of the control system 10.

In addition to the object list, the control system 10 provides the measurement model of the filter unit with data which are the path cues mentioned for the movement path B of one's own motor vehicle 12. For example, these path cues include all roadways, lanes, lane markings and/or boundaries such as guard rails and/or curbs in the surroundings of one's own motor vehicle 12, which are detected by the at least one surroundings sensor 14, 16, 18. Furthermore, a yaw rate and/or a speed of one's own motor vehicle 12, which are made available to the control system 10 by the sensor system inside of one's own motor vehicle 12 are included in the path cues.

It also applies to the path cues that not only absolute parameters but rather probability distributions based on these parameters can be taken into account here in order to represent uncertainties that cannot be detected by the control system 10. If this is the case, the probability distributions of these parameters can be transferred to the measurement model in the form of medians and variances, for example covariances.

This applies accordingly to the state vector(s). All path information can be determined by the control system 10 with reference to the Cartesian coordinate system of one's own motor vehicle 12 which is fixed to the vehicle. The same can apply to the information contained in the state vector.

As shown in FIG. 3, a list with the path cues and the object list are then provided to the measurement model of the filter unit. It is conceivable that the information contained in the object list and in particular the information contained in the path cues, such as yaw rate and vehicle speed of one's own motor vehicle 12, as well as the specific roadway boundaries and roadway markings are made available to the measurement model as raw data (also raw measurement data). In particular, these parameters are not filtered or transformed before they are provided to the measurement model.

Within the measurement model, the position, speed and, optionally, acceleration information of the information contained in the object list per object are transformed from Cartesian coordinates fixed to the vehicle into curvilinear path coordinates (see for example the point Pk in FIG. 2)

using the path cues. The origin of one's own motor vehicle 12 described with reference to FIG. 2 serves as the origin. This transformation is accordingly carried out for each object, in the example according to FIG. 2 for the motor vehicle 28 and on the basis of individual path cues for the motor vehicle 28. Depending on the individual path cues for the motor vehicle 28, the transformation results in particular in lateral and/or longitudinal positions of the corresponding object, that is to say the motor vehicle 28, in path coordinates, that is to say in relation to the movement path B of one's own motor vehicle 12.

In addition, depending on the existing path cues, further information can be provided in path coordinates and related to the corresponding object. The measurement model is therefore specified by the existing path cues.

In other words, a coordinate transformation of the state vector of each object from curvilinear to Cartesian coordinates for the corresponding object and path cues associated with this object is firstly carried out within the measurement model. Also, in the context of the transformation, there is no filtering of the raw measurement data mentioned.

After the transformation, the transformed information, for example as content(s) of a list with measurements in path coordinates, is provided to a filter according to probability theory within the filter unit. This can be, for example, a discrete or a continuous Bayesian filter such as a Kalman continuous filter, but the present disclosure is not limited thereto.

Within the filter according to probability theory, a filter is used to generate a distribution of possible path coordinates of each object of the object list in the y- and/or x-direction, for example, by means of the appropriately configured or adapted Bayes filter and is output at the output of the filter according to probability theory. On the basis of this distribution of path coordinates, the control system 10 can then determine whether the corresponding object is assigned to the movement path B of one's own motor vehicle 12.

The probability that an object is assigned a specific path (i.e. the movement path B or a movement path adjacent to it) at a specific point in time depends on the course of the lateral and/or the longitudinal positions of the corresponding object in path coordinates and from the path boundaries mentioned with reference to FIG. 2 and here, for example, whether the path boundaries and which of the path boundaries are exceeded by the respective object or not. The path boundaries can be determined from the surroundings data by the control system 10 and transformed into path coordinates. The path boundaries can also be included in the path cues.

In certain traffic situations, it can happen that only the two innermost path boundaries $y_p^{bnd,2}$, $y_p^{bnd,3}$ (see for example FIG. 2) are detected by the at least one surroundings sensor 14, 16, 18 of one's own motor vehicle 12. In these cases you can extrapolate the remaining path boundaries $y_p^{bnd,1}$, $y_p^{bnd,4}$ based on a measurement of the width of the currently used traffic lane of one's own motor vehicle 12. In cases in which the current traffic situation takes place on a roadway without lane markings or other roadway boundaries, which is also provided in the context of the present disclosure, preset values are used for the path boundaries, which can be derived, for example, from earlier measurement data of the motor vehicle 12 or from the control system 10.

The course of the lateral and/or the longitudinal positions of the respective objects in path coordinates and the path boundaries thus form the basis for the filter problem, which is solved by means of the discrete or continuous Bayesian filter. The filter is updated sequentially with all available path cues. Because the path is only assigned within the filter, the input data for the filter are not based on data that separates the dynamics of the movement path from the dynamics of the other objects. The filter automatically adapts to the uncertainties of the object in connection with the individually available path cues.

In the discrete case, for example, a probability can first be calculated with which a specific object is located on the left of a right path boundary of a path currently used (assumed by the control system 10). In addition, a probability can be determined with which the corresponding object is located to the left of the left path boundary of the path which is currently used. If these two probabilities are then subtracted from each other, a probability is obtained with which the corresponding object is located within the assumed path.

For example, mean values transformed into path coordinates or other quantiles and/or variances of parameters contained in the state vector and/or in the path cues of the corresponding object are included, for example the path boundaries and lateral and/or longitudinal positions of the corresponding object.

It is assumed that in the case of the filter configuration objects at a certain point in time generally tend to continue to follow the lane currently being used by these objects. In contrast, the basic probabilities that the objects will change lanes at a certain point in time are rather low. In the context of the filtering, the filter configuration therefore carries out an appropriate weighting, for example by means of appropriate modeling of the transition matrix. In the context of the filtering, such a weighting can also include the transformed speed of the respective object, in particular its lateral component, and any blinking signal of a blinking device of the motor vehicle 12 received by the control system 10. A rightward lateral speed (and/or a signal that indicates that the flashing light is on the right of the object) can increase the basic probability that the object will change lanes from the lane currently being used to the lane to the right of it. In contrast, the basic probability of a lane change of the corresponding object to the left is reduced.

At the output of the Bayesian filter, there are probabilities in the discrete case that the corresponding object is on a certain path at a certain point in time, for example on one of the paths that are identified by the path indices I=0 to I=4 (see FIG. 2).

In the continuous case, the filtering of the lateral and/or longitudinal positions or their distributions transformed in path coordinates is carried out first. A continuous distribution of possible path coordinates is then output at the output of the filter according to probability theory. This continuous distribution can—but need not—be discretized within the scope of the present disclosure if necessary using suitable algebraic methods in order to ensure comparability with, for example, discrete filter approaches.

In the continuous case, the speed of the corresponding object is modeled as an input variable for a dynamic system (also referred to as dynamic measurement model). This is done in analogy to the filter configuration presented in the context of the discrete approach and in particular in analogy to the modeling of the transition matrix, but for the continuous case. Speed is not part of the state vector in this case, but the present disclosure is not limited thereto.

Alternatively, it is also conceivable that in the continuous case the acceleration of the corresponding object is modeled as an input variable for the dynamic measurement model. In this case, the acceleration may not form part of the state vector of the corresponding object.

In the case of the constant speed model and the constant acceleration model, the control system 10 assumes that the speed or the acceleration remains constant during a calculation step of the Kalman filter.

Taking into account the acceleration or the speed as input variables and taking into account process noise, one or more equations then result, which provide the longitudinal and/or the lateral position of the corresponding object in path coordinates. This equation or these equations are then provided to the Kalman filter, which provides a continuous distribution, for example in the form of mean and variance, of the longitudinal and/or lateral positions of the object in path coordinates. Both in the continuous and in the discrete case, a module can be used within the filter according to probability theory or in connection with it, which module determines, for example, the median or another suitable quantile of the corresponding distribution.

In the discrete case, the median of the probability distribution of the path indices is estimated. This reduces the distribution to a single path index that identifies one of the paths shown in FIG. 2. In addition, it can be checked here whether the probability of the corresponding path to which the median points (i.e. not a probability of the median itself) exceeds a certain threshold. This can be, for example, 20% or 30% or 40%, but can also assume other values. If this threshold value is not exceeded, no path is initially assigned to the corresponding object due to excessive uncertainty.

In the continuous case, however, the median of the continuous distribution of the lateral and/or longitudinal position distributions of the corresponding object is estimated.

This reduces the distribution to a single position value in the lateral and/or longitudinal direction in path coordinates. If this individual position value lies within lateral and/or longitudinal path boundaries, this path can be assigned to the object. In addition, it can also be checked in the continuous case whether the probability of a lateral and/or longitudinal position of the object, which is identified by the respective medians, in each case exceeds a specific threshold value. This threshold value can also be 20% or 30% or 40%, for example, but can also assume other values. If this threshold value is not exceeded, no path is initially assigned to the corresponding object due to excessive uncertainty.

In order to make the output parameters of the continuous case comparable, for example, with output parameters of the discrete case and/or to use them to generate a distribution representing the discrete path indices I=0 to I=4, the respective continuous distribution can be mapped to a discrete path allocation distribution using information relating to the path boundaries. The control system 10 then uses the median estimate applied in analogy to the discrete approach to estimate a single path index I=0 to I=4.

With reference to the following figures, certain aspects and/or examples will now be described which are used in the context of the present disclosure or which represent specific exemplary embodiments.

In order to obtain certain information for the path assignment, that is to say at least parts of the object list and/or the path cues, the information contained in the state vector and/or in the path cues (a single path cue is considered as path property in the context of this disclosure) is detected by the control system 10 in relation to at least two reference points of an object located in the surroundings of one's own motor vehicle 12. The reference points can be specific areas and/or edges and/or points on the corresponding object.

By taking these at least two reference points into account, the state vectors described above result for each object with respect to each of these reference points. In other words, there are at least two different probability distributions per object, each relating to one of the reference points. The transformation and filtering described above can then be carried out in parallel and independently of one another for these distributions.

Figure 4B:
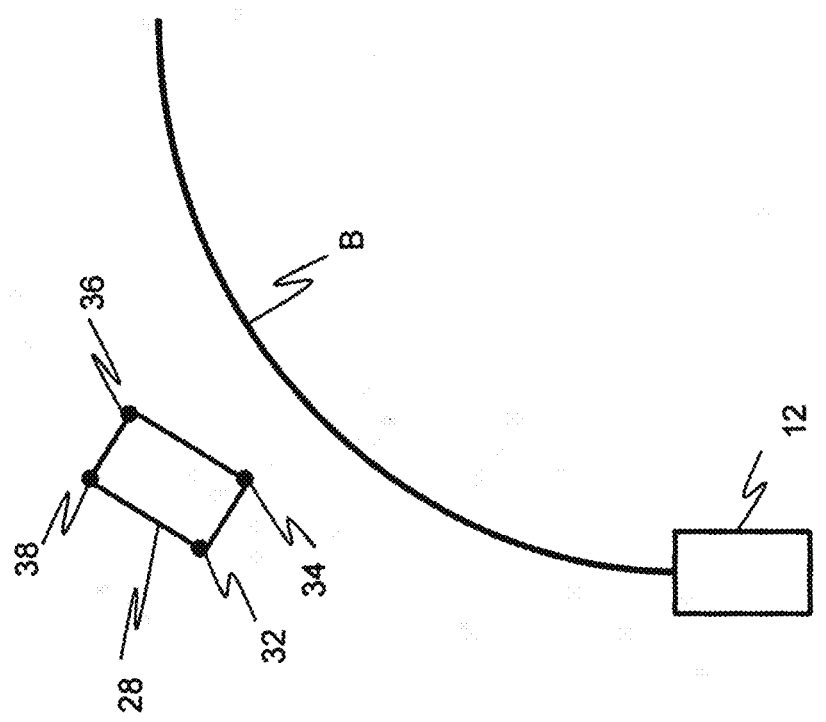
FIGS. 4a and 4b schematically show possible reference points on a motor vehicle in front according to certain exemplary embodiments.
Figure 4A:
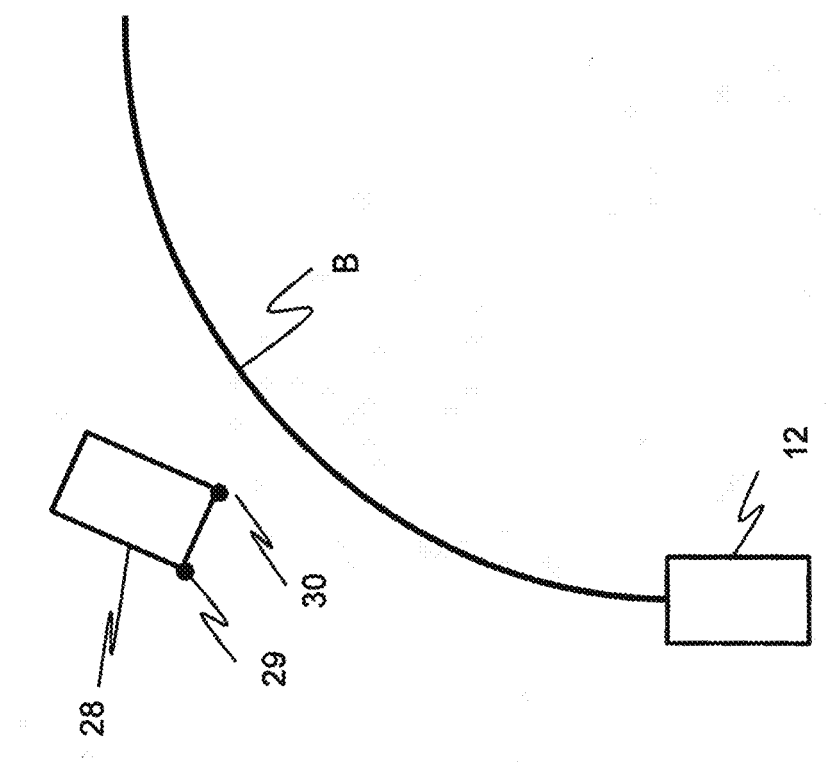

FIG. 4a schematically shows the case in which two reference points 29, 30 are determined in the area of the rear of the other motor vehicle 28 by the control system 10 of one's own motor vehicle 12. A movement path B of one's own motor vehicle is also shown as an example. In the example according to FIG. 4a, exactly two reference points 29, 30 are taken into account. In other words, the control system 10 of one's own motor vehicle 12 uses the reference points 29, 30, which can be located in particular on the outermost edges in the rear region of the other motor vehicle 28, to determine the parameters of the state vector, which in this case consists of two state vectors.

FIG. 4b schematically shows another case in which the control system 10 selects four reference points 32, 34, 36, 38 in the area of the rear and the front of the other motor vehicle 28. Here too, a movement path B of one's own motor vehicle 12 is shown as an example. In the example according to FIG. 4a, exactly four reference points 32, 34, 36, 38 are taken into account. In other words, the control system 10 of one's own motor vehicle 12 uses the areas 32, 34, which can be located in particular on the outermost edges in the rear area of the other motor vehicle 28 and the areas 36, 38, which can be located in particular on the outermost edges in the front area of the other motor vehicle 28, for determining the parameters of the state vector, which in this case consists of four state vectors.

The at least two reference points are not limited to the two or four reference points of FIGS. 4a and 4b. Rather, it is conceivable that, for example, three or five or even more reference points on the other motor vehicle 28 are taken into account for determining the state vector. The position of the reference points is also not limited to the position of these points shown in FIGS. 4a and 4b. It is therefore entirely conceivable that the control system 10 determines reference points at other, in particular outstanding areas of the other motor vehicle 28.

By taking into account several reference points on the other motor vehicle 28 in front, measurement uncertainties which relate to the corresponding object (other motor vehicle 28) can be better compensated for. If, for example, only one reference point on the motor vehicle 28 in front was taken into account in the sense of a ground point model, for example a reference point in the center region of the rear of the motor vehicle 28 (not shown in FIGS. 4a and 4b), it would only be possible to measure the measurement uncertainties of this one reference point of the other motor vehicle 28 with regard to the movement path B of one's own motor vehicle 12.

For this reason, at least two reference points 29, 30 are used in the context of this disclosure. Thus, as shown in FIG. 4a, the two reference points 29, 30 at the rear areas of the other motor vehicle 28 can be assumed in order to represent uncertainties in certain areas of the other motor vehicle 28. The joint consideration of the measurement uncertainties of the left and right rear areas leads to a more precise path assignment, since in this way a vehicle width of the other motor vehicle 28 can be taken into account.

In addition, as shown in FIG. 4b, a further two reference points 36, 38 can be accepted at the front areas of the other motor vehicle 28. However, the present application is not limited thereto. It is also conceivable, for example, that only one of the reference points 36, 38 is assumed in addition to the reference points 32, 34. Since the reference points 36, 38 are located on the right and left front areas of the other motor vehicle 28, this can lead to an even more precise path assignment, since in this way (in conjunction with one of the reference points 32, 34) also a vehicle length of the other motor vehicle 28 can be taken into account.

With reference to FIGS. 5a to 9c, certain driving situations will now be described in which one's own motor vehicle 12 follows another motor vehicle 28, 40. In certain of these driving situations, different information can be taken into account in the state vector or in the state vectors. The transformations and filterings as described with reference to FIGS. 2 and 3 have already been carried out here. All the parameters of the state vector are therefore described in FIGS. 5a to 9c in path coordinates.

FIG. 5a shows two starting scenarios of a driving situation in which one's own motor vehicle 12 follows the other motor vehicle on a straight roadway (see the left illustration in FIG. 5a) and through a curve (see the right illustration in FIG. 5a). Only about one third of the other motor vehicle 28 is in each case located in the lane used by one's own motor vehicle 12 and has a lateral speed component vim which points away from the currently used lane of one's own motor vehicle 12.

FIGS. 5b and 5c show different estimation positions 28' of the other motor vehicle 28, taking into account only the lateral position of the other motor vehicle 28 in the state vector (FIG. 5b) or with additional consideration of the lateral speed $v_{lat}$ of the other motor vehicle 28 in the state vector (FIG. 5c).

The dashed area of the estimation position 28' in each case identifies the uncertainties that arise during the estimation or the deviations from a best possible estimation position 28', which can correspond to the actual position of the other motor vehicle 28.

It applies to both output scenarios in FIG. 5a that the driving situation from FIG. 5b arises if only the lateral position of the other motor vehicle 28 is taken into account in the state vector. As shown in FIG. 5b with the aid of straightened coordinates for better comparability of the starting situations, the estimation position 28' for the other motor vehicle 28 is located within the lane used by one's own motor vehicle 12. The filter unit here even assigns a position to the estimation position 28' that is still further to the center of the current lane of one's own motor vehicle 12 than the actual position of the other motor vehicle 12. This leads to a significant probability that the other motor vehicle 28 uses the path (here the lane) used by one's own motor vehicle 12 and the other motor vehicle 28 would thus have to be assigned to the movement path of one's own motor vehicle 12 by the control system 10. At the same time, the estimation uncertainty is large, which is indicated by the dashed area of the estimation position 28' which is shown larger in comparison to FIG. 5c.

In the case according to FIG. 5c, the lateral component of the speed $v_{lat}$ of one's own motor vehicle 12 is taken into account in the state vector. This results in a lower probability of the other motor vehicle 28 using the path used by one's own motor vehicle 12, which is illustrated by the estimation position 28' of the other motor vehicle 28 in FIG. 5c. The estimation position 28' overlaps the path used by one's own motor vehicle 12 to only about a quarter. At the same time, the estimation uncertainty, that is to say the dashed area of the estimation position 28', is reduced in comparison to FIG. 5b. The other motor vehicle 28 would thus be assigned by the control system 10 to a movement path adjacent to (or not at all) the movement path of one's own motor vehicle 12.

The situation is similar in the traffic scenario shown in FIGS. 6a to 6c. Here again, FIG. 6a shows the starting situation on a straight (left-hand illustration of FIG. 6a) or a curvy (right-hand illustration) lane in which one's own motor vehicle 12 follows the other motor vehicle 28. In contrast to FIG. 5a, the other motor vehicle 28 is located in a lane that is adjacent to the lane used by one's own motor vehicle 12 and has a lateral speed component $v_{lat}$ that points in the direction of the lane of one's own motor vehicle 12.

FIGS. 6b and 6c in turn show different estimation positions 28' of the other motor vehicle 28, taking into account only the lateral position of the other motor vehicle 28 in the state vector (FIG. 6b) or taking additional account of the lateral speed $v_{lat}$ of the other motor vehicle 28 in the state vector (FIG. 6c), The dashed area of the estimation position 28' in turn identifies the uncertainties that arise during the estimation or the deviations from the best possible estimation position 28' for the other motor vehicle 28.

For both output scenarios in FIG. 6a, the driving situation from FIG. 6b applies if only the lateral position of the other motor vehicle 28 is taken into account in the state vector. As shown in FIG. 6b with the aid of straightened coordinates for better comparability of the starting situations, the estimation position 28' for the other motor vehicle 28 is indeed within the lane (path) used by one's own motor vehicle 12. The filter unit here, however, assigns a position to the estimation position 28' which is further to the right roadway boundary of the current lane of one's own motor vehicle 12. As a result, there is still a significant probability that the other motor vehicle 28 uses the path adjacent to the path used by one's own motor vehicle 12. The other motor vehicle 28 would thus be assigned to the path located to the right of the movement path of one's own motor vehicle 12 by the control system 10. At the same time, the estimation uncertainty is large, which is indicated by the dashed area of the estimation position 28' which is shown larger in comparison to FIG. 6c.

In the case according to FIG. 6c, the lateral component of the speed $v_{lat}$ of one's own motor vehicle 12 is taken into account in the state vector. This results in a higher probability that the other motor vehicle 28 uses the path used by one's own motor vehicle 12, which is illustrated by the estimation position 28' of the other motor vehicle 28 in FIG. 6c. The estimated position 28' overlaps the path used by one's own motor vehicle 12 by approximately two thirds. At the same time, the estimation uncertainty, that is to say the dashed area of the estimation position 28', is reduced in comparison to FIG. 6b. The control system 10 would thus assign the other motor vehicle 28 to the movement path of one's own motor vehicle 12.

Figure 7B:
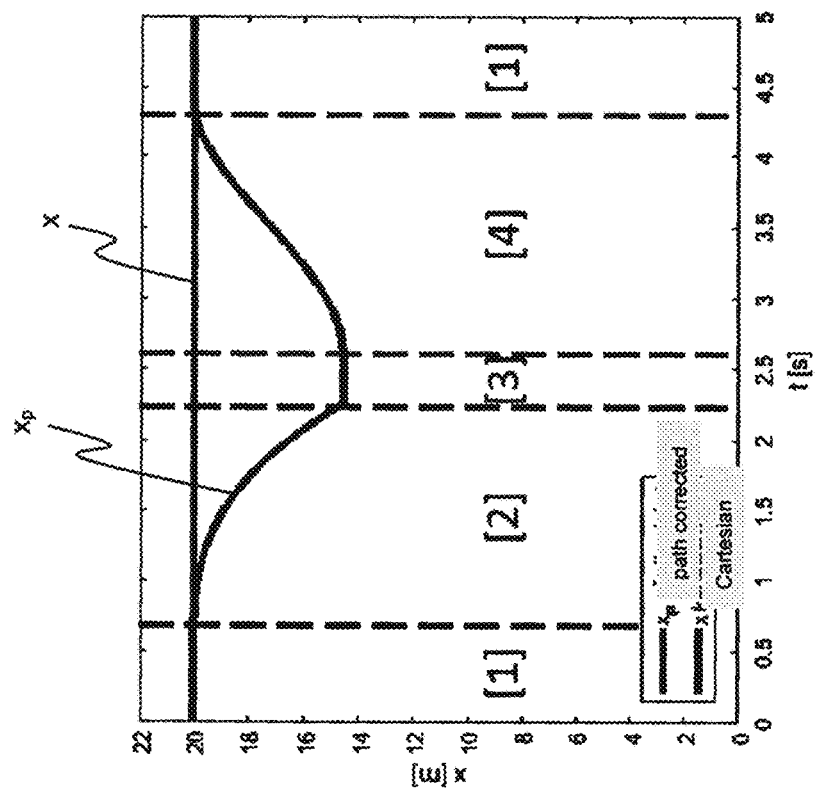
FIGS. 7a and 7b schematically show a follow-up drive of one's own motor vehicle behind a motor vehicle in front through a curve or, respectively, possible varying distances between the motor vehicles according to certain embodiments.
Figure 7A:
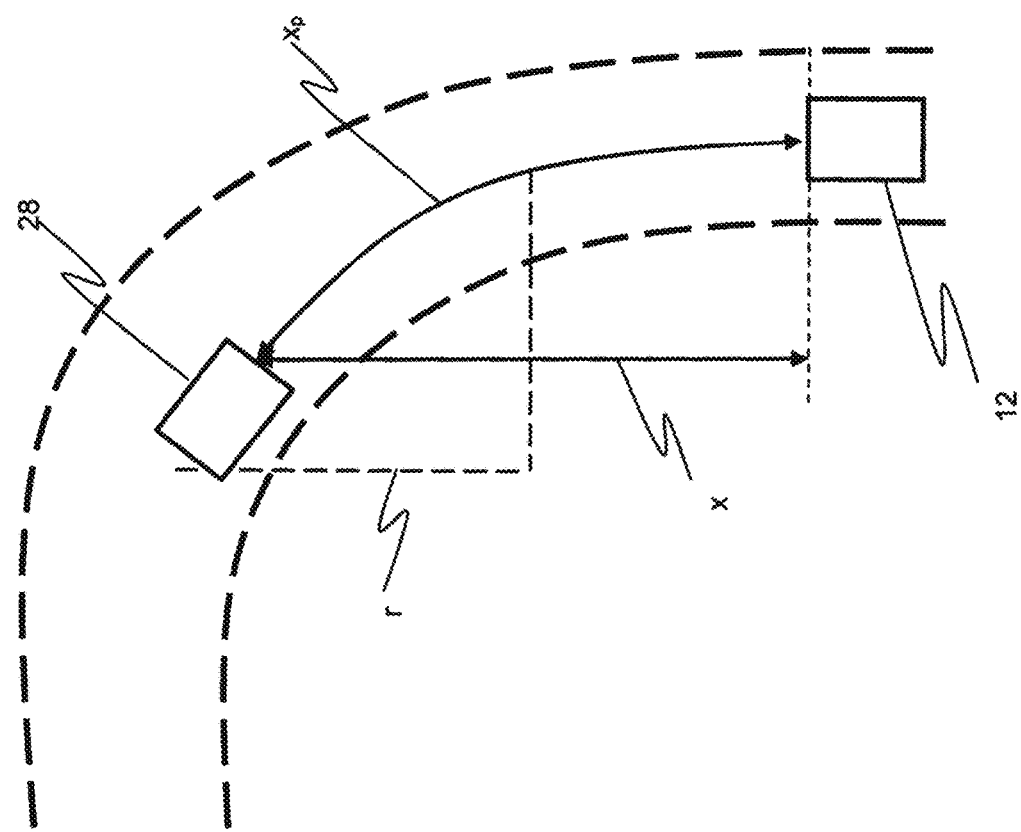

FIG. 7a shows a driving situation in which one's own motor vehicle 12 follows the other motor vehicle 28 through a left turn. This is a distance-controlled follow-up drive, so the distance between motor vehicles 12 and 28 should remain constant. This distance refers to the distance $x_p$ in path coordinates and is 20 meters as an example. The speed is, for example, 40 km/h, the curve radius r of the 90° curve is 15 meters. FIG. 7b illustrates changes in distance as part of the distance-controlled follow-up drive, taking into account various information in the state vector. In the example according to FIGS. 7a and 7b, the state vector consists either of a combination of lateral and longitudinal positions of the motor vehicle 28 or of a combination of lateral and longitudinal positions and a longitudinal speed of the other motor vehicle 28.

FIG. 7b shows different sections of the distance-controlled follow-up drive from FIG. 7a. In the section identified with [1] in FIG. 7b, both motor vehicles 12, 28 drive on the straight section of the roadway from FIG. 7a before the other motor vehicle 28 turns into the curve. In the section identified with [2] in FIG. 7b, one's own motor vehicle 12 is still on the straight section of the roadway ahead of the curve from FIG. 7a, while the other motor vehicle 28 is already in the curve. In the section identified with [3] in FIG. 7b, both motor vehicles 12, 28 are in the curve from FIG. 7a. In the section identified with [4] in FIG. 7b finally, one's own motor vehicle 12 is still in the curve from FIG. 7a, while the other motor vehicle 28 is already on the straight section of the roadway after the exit from the curve.

This is followed by a further section [1] in which both motor vehicles 12, 28 have left the curve.

FIG. 7b shows the effect of including the longitudinal distance in the state vector, specifically in path coordinates $x_p$. It can be seen there that the distance between motor vehicles 12 and 28 remains constant over sections [2] to [4]. Accordingly, there are no undesired braking maneuvers of one's own motor vehicle 12 during the follow-up drive through the curve. If only the distance x were used here in Cartesian, that is not path-corrected coordinates, the distance between the motor vehicles 12, 28 would be shortened (see section [2] in FIG. 7b) or extended (see section [3] in FIG. 7b), if only one of the two motor vehicles 12, 28 is within the curve. This would go hand in hand with undesired (negative or positive) accelerations of one's own motor vehicle 12. The additional inclusion of the derivation of the longitudinal position $x_p$, that is to say the longitudinal speed of the other motor vehicle 28 in path coordinates in the state vector, helps to keep the distance between the motor vehicles 12, 28 even more precisely constant and thus to avoid the undesirable accelerations mentioned above.

FIG. 8a shows two starting scenarios of a driving situation in which one's own motor vehicle 12 follows the other motor vehicle 28 on a straight roadway with a turning lane to the right (see the left figure in FIG. 8a) or through a curve with a turning lane to the right (see the illustration on the right hand side of FIG. 8a). The movement paths B of one's own motor vehicle 12 are additionally indicated in FIG. 8a. The other motor vehicle 28 is in each case only with a minimal extent in the left rear region on the lane used by one's own motor vehicle 12 and has a speed component v which points away from the lane of the motor vehicle 12 currently being used.

FIGS. 8b and 8c show the different estimation positions 28' of the other motor vehicle 28, taking into account only position information (lateral and longitudinal) of the other motor vehicle 28 in the state vector (FIG. 8b) or taking additional account of the lateral and longitudinal speeds $v_{lat}$ or $v_{long}$ of the other motor vehicle 28 in the state vector (FIG. 8c). The dashed area of the estimation positions 28' in each case identifies the uncertainties that arise during the estimation or the deviations from a best possible estimation position 28'.

For both output scenarios in FIG. 8a, the driving situation from FIG. 8b applies if only the lateral and longitudinal positions of the other motor vehicle 28 are taken into account in the state vector. As shown in FIG. 8b with the aid of straightened coordinates for better comparability of the starting situations, the estimation position 28' for the other motor vehicle 28 is located within the lane traveled by one's own motor vehicle 12. The filter unit here assigns a position to the estimation position 28' that is significantly further to the middle of the current lane used by one's own motor vehicle 12.

This leads to a significant probability that the other motor vehicle 28 uses the path used by one's own motor vehicle 12, and the other motor vehicle 28 would thus have to be assigned to the movement path of one's own motor vehicle 12 by the control system 10. At the same time, the estimation uncertainty is large, which is indicated by the considerable extent of the dashed area of the estimation position 28'.

In the case according to FIG. 8c, the lateral and longitudinal speed components $v_{lat}$ and $v_{long}$ of the other motor vehicle 28 are also taken into account in the state vector. This results in a very low probability that the other motor vehicle 28 uses the path used by one's own motor vehicle 12, which is illustrated by the estimation position 28' of the other motor vehicle 28 in FIG. 8c. The estimation position 28' only overlaps the path used by one's own motor vehicle 12 in the rear left rear area and essentially corresponds to the actual positions of the other motor vehicle 28 shown in FIG. 8a. This minimizes the estimation uncertainty, which is why there is no dashed area in FIG. 8c at the estimation position 28' of the other motor vehicle 28. The other motor vehicle 28 would thus be assigned by the control system 10 to a movement path adjacent to the movement path B of one's own motor vehicle 12 (or to no movement path at all).

Figure 9C:
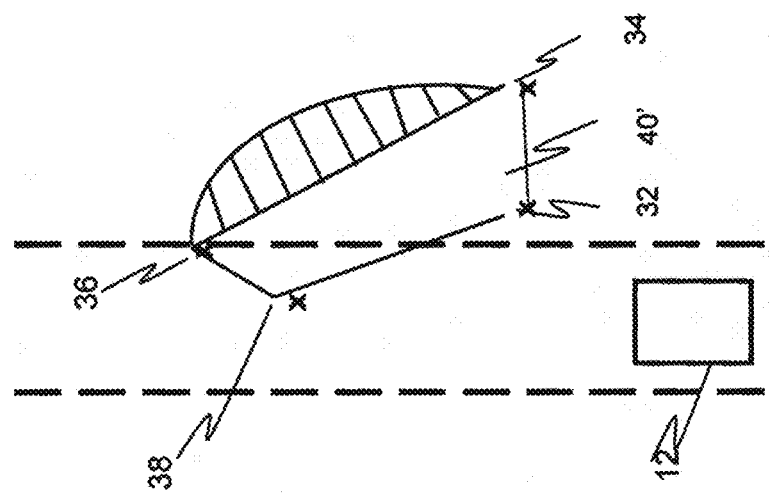
FIGS. 9a to 9c schematically show a driving situation in which one's own motor vehicle travels behind another motor vehicle with excess length respectively corresponding various estimated positions of the motor vehicle in front based on different reference points according to certain exemplary embodiments.
Figure 9B:
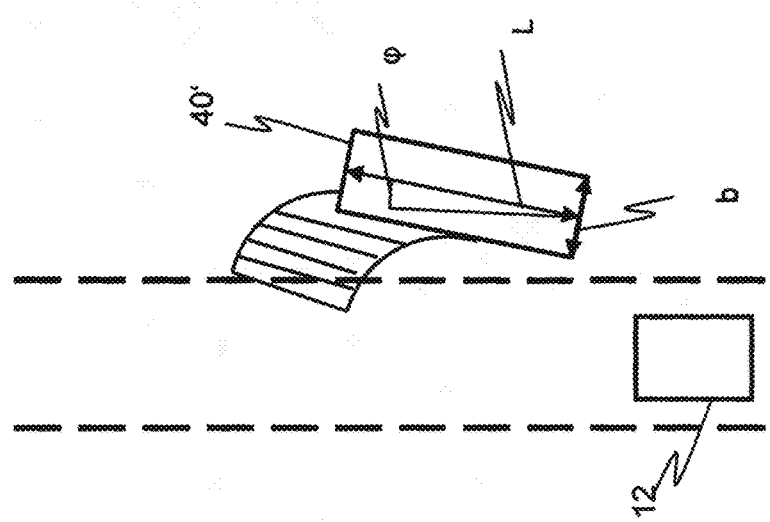
Figure 9A:
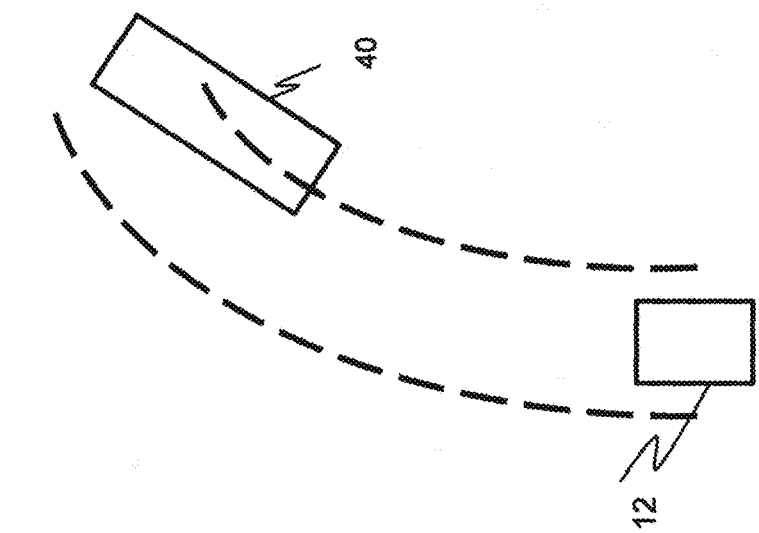

FIG. 9a shows an initial scenario of a driving situation in which one's own motor vehicle 12 follows another motor vehicle 40. The other motor vehicle 40 is an excess length motor vehicle. The other motor vehicle 40 is located with a comparatively small expansion in the front left front area on the lane (path) used by one's own motor vehicle 12. According to this initial situation, the roadway for one's own motor vehicle 12 is not clear for overtaking the other motor vehicle 40.

FIGS. 9b and 9c show different estimation positions 40' of the other motor vehicle 40, taking into account different state vectors. In the case of FIG. 9b, the lateral and longitudinal positions of the other motor vehicle 40, its length L and its width b, and the angle φ of the longitudinal axis of the other motor vehicle 40 with respect to the lane of one's own motor vehicle 12 are included. This state vector is determined by the control system 10 with respect to a reference point located in the middle of the rear area of the other motor vehicle 40.

In contrast, four reference points are selected in FIG. 9c (see also the description with reference to FIGS. 4a and 4b). A state vector with longitudinal and lateral positions in path coordinates is determined for each of the reference points. The dashed areas of the estimation positions 40' in each case identify the resulting uncertainties in the estimation or the deviations from the best possible estimation position 40'.

The situation shown in FIG. 9b results when the state vector is determined only with reference to a reference point in the middle of the rear area of the other motor vehicle 40. As shown in FIG. 9b on the basis of straightened coordinates, the estimation position 40' for the other motor vehicle 40 is completely outside of the lane used by one's own motor vehicle 12.

The filter unit thus assigns a position to the estimation position 40' which is located significantly further outside the current path used by one's own motor vehicle 12 compared to the real situation from FIG. 9a. As a result, despite the consideration of the vehicle width and length and the angle φ in path coordinates of the other motor vehicle 40, this other motor vehicle 40 would have to be assigned a movement path adjacent to the movement path of one's own motor vehicle 12 by the control system 10. At the same time, the estimation uncertainty is large, which is indicated by the significant expansion of the dashed area of the estimation position 40'.

In the case according to FIG. 9c, only the lateral and longitudinal positions of the other motor vehicle 40 are taken into account, but in relation to a total of four reference points 32, 34, 36, 38. For a basic description of the consideration of four (or at least two) reference points, reference is made to the explanations relating to FIGS. 4a and 4b. By taking the reference points 32, 34, 36 and 38 into account, there is a significant probability that the other motor vehicle 40 uses the path used by one's own motor vehicle 12, which is illustrated by the estimated position 40' of the other motor vehicle 40 in FIG. 9c. The estimation position 40' overlaps the path used by one's own motor vehicle 12 approximately by half. The control system 10 would thus assign the other motor vehicle 40 to the movement path of one's own motor vehicle 12.

By including the at least two reference points and thus at least two probability distributions, which, as in the example from FIG. 9, relate to protruding points on the other motor vehicle, the path assignment can also be used for very wide or long objects such as the other motor vehicle 40 with excess length or other special vehicles such as agricultural vehicles in an exact manner. This is illustrated in FIG. 9c. If only the reference point 32 were taken into account here, the control system 10 could not assign a significant probability that the other motor vehicle 40 uses the path used by one's own motor vehicle 12 to the estimation position 40' of the other motor vehicle 40. This is made possible by additional consideration of the reference points 36, 38.

It goes without saying that the examples in FIGS. 5 to 9—in particular with regard to the content of the respective state vectors—are not to be understood as being exhaustive. For example, in the state vectors described with reference to FIGS. 5 to 9, some or more or all of the parameters contained in these state vectors can be combined in one state vector or in several state vectors per object.

The control system 10 selects one or more of the other motor vehicles 28, 40 from all objects or other motor vehicles 28, 40 which the control system 10 assigns to the path used by one's own motor vehicle 12 or a path parallel to this path, which should then be the target of one or more driver assistance systems of one's own motor vehicle 12, that is to say to which the specific driver assistance systems of one's own motor vehicle 12 in the current driving situation should react.

The selection is then made available by the control system 10 to the corresponding driver assistance system or the corresponding driver assistance systems of one's own motor vehicle 12. These driver assistance systems are, for example, ACC systems, emergency brake assistants and/or "blind spot monitors."

The predetermined condition is fulfilled, for example, when another motor vehicle 28, 40 falls short of a certain distance in the longitudinal and/or lateral direction from one's own motor vehicle 12, or when there is a certain probability that the other motor vehicle 28, 40 performs a certain driving maneuver. This driving maneuver can be, for example, an acceleration procedure, a braking procedure, a lane change or an overtaking procedure. The predetermined condition can also be met if there is a certain combination of the distance between the other motor vehicle 28, 40 and one's own motor vehicle 12 and a probability of a certain maneuver.

Figure 10:
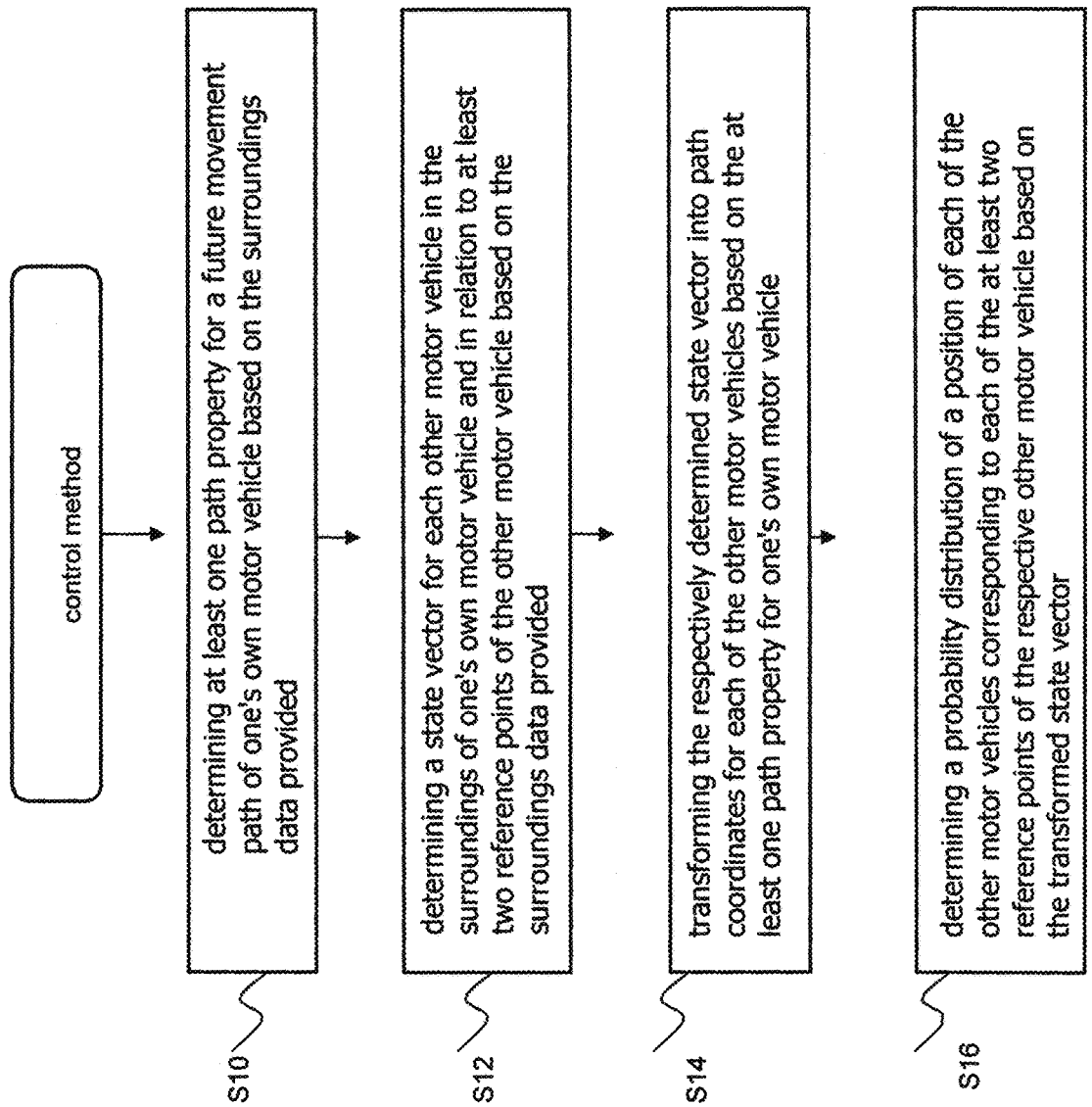
FIG. 10 schematically shows a flow chart for a control method according to certain embodiments.

In other words, the control system 10 of one's own motor vehicle 12 can in particular select the other motor vehicle 28, 40 that is most relevant for the respective driver assistance system in the current driving situation. For example, one of the other motor vehicles 28, 40 is selected for the ACC system that is most likely suitable for a distance-controlled follow-up drive. Instead, the other motor vehicle 28, 40 is selected for the emergency brake assistant or the CMB for which the probability of an accident with one's own motor vehicle 12 is greatest, FIG. 10 shows a flowchart for a control method which, based on surroundings data obtained by at least one surroundings sensor arranged on one's own motor vehicle 12, detects lanes, roadway boundaries, roadway markings and/or other motor vehicles in an area in front of, to the side of and/or behind one's own motor vehicle 12. The control method can be carried out, for example, by the control system 10 of one's own motor vehicle 12 described above. All of the features described in the context of the control system can also be used for the control method. In particular, all of the features described above with regard to the use of at least two reference points on the other motor vehicle 28, 40, the parameters of the path cues (or path properties) and the state vectors, the transformation into path coordinates using the path cues, the filtering by means of the filters according to probability theory as well as the selection of the other motor vehicles 28, 40 and the provision of the corresponding data for one or more driver assistance systems of one's own motor vehicle 12 can be transferred to the control method.

In a first step S10, at least one path property for a future movement path of one's own motor vehicle 12 is determined based on the surroundings data provided.

In a second step S12, state vectors for each other motor vehicle 28, 40 in the surroundings of one's own motor vehicle 12 and with respect to at least two reference points of the respective other motor vehicle 28, 40 is determined based on the surroundings data provided.

In a third step S14, the respectively determined state vector for each of the other motor vehicles 28, 40 is transformed into path coordinates based on the at least one path property for one's own motor vehicle 12.

In a fourth step S16, a probability distribution of a position of each of the other motor vehicles 28, 40 corresponding to each of the at least two reference points of the respective other motor vehicle 28, 40 is determined based on the respectively transformed state vector.

The variants described above as well as their construction and operational aspects only serve to better understand the structure, the mode of operation and the properties; they do not restrict the disclosure to the exemplary embodiments. The figures are partially schematic in order to illustrate the functions, operating principles, technical designs and features. Every function, every principle, every technical design and every feature, which is/are disclosed in the figures or in the text, with all claims, every feature in the text and in the other figures, other functions, principles, technical designs and features that are contained in or result from this disclosure can be combined freely and as desired, so that all conceivable combinations of the variants described can be assigned. Combinations between all the individual versions in the text, that is to say in each section of the description, in the claims and also combinations between different variants in the text, in the claims and in the figures are also included. The claims also do not limit the disclosure and thus the possible combinations of all the features shown. All disclosed features are explicitly disclosed here individually and in combination with all other features.

It is understood that the exemplary embodiments explained above are not conclusive and do not limit the subject matter disclosed here. In particular, it is apparent to the person skilled in the art that he can combine the features of the different embodiments with one another and/or can omit different features of the embodiments without deviating from the subject matter disclosed here.

The invention claimed is:

1. A control system that is set up for use in one's own motor vehicle, based on surroundings data obtained from at least one surroundings sensor assigned to the one's own motor vehicle, which detects lanes, roadway boundaries, roadway markings and/or other motor vehicles in a surroundings area in front of, to the side of and/or behind the one's own motor vehicle, wherein the at least one surroundings sensor is set up to provide the surroundings data to an electronic control unit of the control system, the surroundings data representing the surroundings area in front of, to the side of and/or behind the one's own motor vehicle, and wherein the control system is at least set up to:
 determine at least one path property for a future movement path of the one's own motor vehicle based on the surroundings data provided;
 determine state vectors based on the surroundings data provided for each of the other motor vehicles in the surroundings area of the one's own motor vehicle and corresponding with at least two reference points for each of the respective other motor vehicles that define at least one of a length and a width of the corresponding other motor vehicle, the at least two reference points corresponding to corners for each of the respective other motor vehicles, the state vectors defining lateral and longitudinal position distributions for the at least two reference points for each of the respective other motor vehicles;
 transform the respectively determined state vectors for each of the other respective motor vehicles into path coordinates based on the lateral and longitudinal position distributions defined in the state vectors and at least one path property for the one's own motor vehicle;
 determine at least two probability distributions of a position of each of the other motor vehicles, corresponding to each of the at least two reference points of each of the respective other motor vehicles, based on the respectively transformed state vectors and at least one of the length and the width of the corresponding other motor vehicle; and
 control a driver assistance system of the one's own motor vehicle to perform a driving maneuver based on the future movement path of the one's own motor vehicle and the determined positions of each of the other motor vehicles.

2. The control system according to claim 1, wherein the at least one path property contains only raw measurement data associated with at least one of the following parameters:
 a yaw rate of the one's own motor vehicle;
 a steering angle of the one's own motor vehicle;
 a speed of the one's own motor vehicle;
 lane markings and/or roadway boundaries of a roadway currently being used by the one's own motor vehicle; and
 one or more future movement paths and/or stopping points of one or more future movement paths of one or more of the other motor vehicles and/or the one's own motor vehicle.

3. The control system according to claim 1, which is further set up to determine the at least two reference points for each of the respective other motor vehicles as reference points on the left and right rear corner areas of the corresponding other motor vehicle to map the width of the corresponding other motor vehicle.

4. The control system according to claim 1, wherein the at least two reference points for each of the respective other motor vehicles comprise four reference points, and wherein the control system is further set up to determine the four reference points for each of the respective other motor vehicles as reference points on the left and right rear corner areas and on the left and right front corner areas of the corresponding other motor vehicle to map the length and the width of the corresponding other motor vehicle.

5. The control system according to claim 1, which is further set up to determine the state vectors for each of the other motor vehicles as raw measurement data associated with one or more of the following parameters:
 a lateral position of the corresponding other motor vehicle;
 a lateral speed of the corresponding other motor vehicle;
 a lateral acceleration of the corresponding other motor vehicle;
 a longitudinal position of the corresponding other motor vehicle;
 a longitudinal speed of the corresponding other motor vehicle; and
 a longitudinal acceleration of the corresponding other motor vehicle.

6. The control system according to claim 1, which is further set up to
 determine state vectors corresponding with four reference points, corresponding to four corners, for each of the respective other motor vehicles for mapping both the length and the width of the corresponding other motor vehicle; and
 determine the probability distribution of the position of each of the other motor vehicles based on both the length and the width of the corresponding other motor vehicle.

7. The control system according to claim 1, which is further set up to filter the transformed state vectors of each of the other motor vehicles using a multidimensional probability-based filter unit.

8. The control system according to claim 7, which is further set up to:
 determine the probability distribution of the position of each of the other motor vehicles based on the filtered state vectors of each of the other motor vehicles as a probability distribution of the lateral position distribution and/or as a probability distribution of the longitudinal position distribution of the corresponding other motor vehicle corresponding to each of the at least two reference points of the corresponding other motor vehicle in path coordinates, wherein the probability distribution of the lateral position and/or the probability distribution of the longitudinal position corresponding to each of the at least two reference points of the corresponding motor vehicle is estimated to an individual value; and
 determine, based on the estimated individual values for the corresponding other motor vehicle whether the corresponding other motor vehicle is assigned to the movement path for one's own motor vehicle.

9. The control system according to claim 8, which is further set up to select one or more of the other motor vehicles from all the other motor vehicles assigned to the movement path for the one's own motor vehicle in accordance with one or more predetermined conditions, and to provide the selection in the form of data to one or more driver assistance systems of the one's own motor vehicle.

10. A control method for controlling one's own motor vehicle based on surroundings data obtained by at least one surroundings sensor assigned to the one's own motor vehicle, which detects lanes, roadway boundaries, roadway markings and/or other motor vehicles in a surroundings area in front of, to the side of and/or behind one's own motor vehicle, wherein the control method comprises at least the following steps:
- determining at least one path property for a future movement path of the one's own motor vehicle based on the surroundings data provided;
- determining state vectors based on the surroundings data provided for each of the other motor vehicles in the surroundings area of the one's own motor vehicle and in relation to at least two reference points of the respective other motor vehicles that define at least one of a length and a width of the corresponding other motor vehicle, the at least two reference points corresponding to corners for each of the respective other motor vehicles, the state vectors defining lateral and longitudinal position distributions for the at least two reference points for each of the respective other motor vehicles;
- transforming the respectively determined state vectors into path coordinates for each of the other respective motor vehicles based on the at least one path property for the one's own motor vehicle;
- determining at least two probability distributions of a position of each of the other motor vehicles, corresponding to each of the at least two reference points of each of the respective other motor vehicles, based on the corresponding transformed state vectors and at least one of the length and the width of the corresponding other motor vehicle; and
- controlling a driver assistance system of the one's own motor vehicle to perform a driving maneuver based on the future movement path of the one's own motor vehicle and the determined positions of each of the other motor vehicles.

11. The control method according to claim 10, wherein the determined state vectors correspond with four reference points, corresponding to four corners, for each of the respective other motor vehicles for mapping both the length and the width of the corresponding other motor vehicle, and the probability distribution of the position of each of the other motor vehicles is determined based on both the length and the width of the corresponding other motor vehicle.

12. A motor vehicle comprising a control system that is set up for use in one's own motor vehicle, based on surroundings data obtained from at least one surroundings sensor assigned to the one's own motor vehicle, which detects lanes, roadway boundaries, roadway markings and/or other motor vehicles in a surroundings area in front of, to the side of and/or behind the one's own motor vehicle, wherein the at least one surroundings sensor is set up to provide the surroundings data to an electronic control unit of the control system, the surroundings data representing the surroundings area in front of, to the side of and/or behind the one's own motor vehicle, and wherein the control system is at least set up to:
- determine at least one path property for a future movement path of the one's own motor vehicle based on the surroundings data provided;
- determine state vectors based on the surroundings data provided for each of the other motor vehicles in the surroundings area of the one's own motor vehicle and corresponding with at least two reference points for each of the respective other motor vehicles that define at least one of a length and a width of the corresponding other motor vehicle, the at least two reference points corresponding to corners for each of the respective other motor vehicles, the state vectors defining lateral and longitudinal position distributions for the at least two reference points for each of the respective other motor vehicles;
- transform the respectively determined state vectors for each of the other respective motor vehicles into path coordinates based on the at least one path property for the one's own motor vehicle;
- determine at least two probability distributions of a position of each of the other motor vehicles, corresponding to each of the at least two reference points of each of the respective other motor vehicles, based on the respectively transformed state vectors and at least one of the length and the width of the corresponding other motor vehicle; and
- control a driver assistance system of the one's own motor vehicle to perform a driving maneuver based on the future movement path of the one's own motor vehicle and the determined positions of each of the other motor vehicles.

* * * * *